United States Patent
Flanagan et al.

(10) Patent No.: US 11,243,989 B1
(45) Date of Patent: Feb. 8, 2022

(54) CONFIGURABLE, STREAMING HYBRID-ANALYTICS PLATFORM

(71) Applicant: Noragh Analytics, Inc., Clifton, VA (US)

(72) Inventors: William Flanagan, Eastville, VA (US); Michael H. Cahill, Ashton, MD (US); Jesse A. Bowes, Colorado Springs, CO (US); Barbara A. Flanagan, Eastville, VA (US); Robyn Todd, Herndon, VA (US)

(73) Assignee: Noragh Analytics, Inc., Clifton, VA (US)

( * ) Notice: Subject to any disclaimer, the term of this patent is extended or adjusted under 35 U.S.C. 154(b) by 0 days.

(21) Appl. No.: 17/367,079

(22) Filed: Jul. 2, 2021

(51) Int. Cl.
*G06F 40/30* (2020.01)
*G06F 16/33* (2019.01)
*G06F 40/279* (2020.01)
*G06F 16/31* (2019.01)
*G06F 40/14* (2020.01)
*G06N 5/02* (2006.01)
*G06F 40/205* (2020.01)

(52) U.S. Cl.
CPC ........ *G06F 16/322* (2019.01); *G06F 16/3335* (2019.01); *G06F 40/14* (2020.01); *G06F 40/205* (2020.01); *G06F 40/30* (2020.01); *G06N 5/025* (2013.01)

(58) Field of Classification Search
CPC .... G06F 40/211; G06F 40/253; G06F 40/268; G06F 40/284; G06F 40/30; G06F 40/279; G06F 16/3329
See application file for complete search history.

(56) References Cited

U.S. PATENT DOCUMENTS

| | | | | |
|---|---|---|---|---|
| 7,669,119 B1* | 2/2010 | Orelind | ................. | G06F 16/345 715/234 |
| 7,950,062 B1* | 5/2011 | Ren | ........................ | G06F 21/55 726/26 |
| 10,002,129 B1* | 6/2018 | D'Souza | ............... | G06F 40/289 |
| 2009/0193325 A1* | 7/2009 | Fume | ..................... | G06F 16/93 715/205 |
| 2012/0216114 A1* | 8/2012 | Privault | .............. | G06F 3/04883 715/702 |
| 2012/0303661 A1* | 11/2012 | Blohm | .................. | G06F 40/295 707/776 |
| 2013/0304742 A1* | 11/2013 | Roman | ................. | G06F 16/285 707/740 |

(Continued)

*Primary Examiner* — Lamont M Spooner
(74) *Attorney, Agent, or Firm* — Perkins Coie LLP

(57) ABSTRACT

An analytics platform for the extraction of structured observations from largely narrative sources using a hybrid approach of user configuration and machine learning is provided. The analytics platform collects and normalizes data from public and private sources and applies extractions to the data to create a world view of objects, traits, and relationships of interest and maintains that world view as data and/or extractions are updated. The platform is further configured to apply queries to the extracted world view for a variety of purposes including scoring objects for prioritized attention, generating notifications when specific conditions are met, providing data sets for exploratory analysis, and triggering the automatic collection of enhancing data from external sources.

30 Claims, 10 Drawing Sheets

(56) References Cited

U.S. PATENT DOCUMENTS

| | | | | |
|---|---|---|---|---|
| 2014/0310225 | A1* | 10/2014 | Huang | G06N 5/025 |
| | | | | 706/48 |
| 2015/0149879 | A1* | 5/2015 | Miller | G06F 16/2477 |
| | | | | 715/226 |
| 2015/0154269 | A1* | 6/2015 | Miller | G06F 16/2477 |
| | | | | 715/780 |
| 2016/0224541 | A1* | 8/2016 | Yakovlev | G06F 40/30 |
| 2016/0224542 | A1* | 8/2016 | Bulgakov | G06F 40/30 |
| 2017/0139887 | A1* | 5/2017 | Miller | G06F 40/166 |
| 2017/0235885 | A1* | 8/2017 | Cox | G16H 15/00 |
| | | | | 705/2 |
| 2018/0096060 | A1* | 4/2018 | Peled | G06F 16/35 |
| 2018/0232528 | A1* | 8/2018 | Williamson | G06F 21/6254 |
| 2018/0267947 | A1* | 9/2018 | Miller | G06F 16/2477 |
| 2019/0361900 | A1* | 11/2019 | Rogynskyy | H04L 51/12 |
| 2020/0012715 | A1* | 1/2020 | Miller | G06F 16/2477 |
| 2020/0034414 | A1* | 1/2020 | Miller | G06F 40/279 |
| 2020/0371825 | A1* | 11/2020 | Mathew | G06N 5/02 |
| 2021/0042309 | A1* | 2/2021 | Mustafi | G06F 16/282 |
| 2021/0103699 | A1* | 4/2021 | Takeuchi | G06F 40/268 |
| 2021/0174009 | A1* | 6/2021 | Miller | G06F 16/2477 |

\* cited by examiner encoded patterns with assigned IDs:

1. /boris/
2. /doris/
3. /jake/
4. /jane/
5. /jim/
6. /mat/
7. /matt/
8. /mic|mike/
9. /mikey?/
10. /milo/

CONFIGURABLE, STREAMING HYBRID-ANALYTICS PLATFORM

FIELD OF THE INVENTION

The present invention relates generally to data analytics and more specifically to an analytics platform based on the extraction of structured observations from largely narrative text sources and based on a hybrid approach of user configuration and machine learning.

BACKGROUND

Narrative text makes up a large percentage of the data available in the world for analysis. Systematic analysis of the content of text requires a mapping of concepts in text into structured information, i.e., objects, traits, and relationships, which in turn requires natural language understanding (NLU). Prior analytics tools include Natural Language Processing (NLP) tools which can be arranged in a pipeline to analyze data but does not achieve NLU. Even prior to the 1980s, the academic community recognized that the only real way to achieve natural language understanding in a computer, to have a system that can draw conclusions, make inferences, understand humor, and not act inappropriately, is to model human cognition first. Language, cognition, and culture go hand-in-hand. This is a task far beyond the abilities of existing products. What is required is a hybrid solution that marries human insight on what is important and on how to model the world with an analytics system that employs a combination of efficient extraction techniques and focused machine learning techniques. This has been largely overlooked by the research community which has focused instead, almost wholly, on NLP.

The boom in big data and machine learning led to a refocus of text analysis as NLP. NLP is considered "context-thin" and doesn't actually try to extract meaning from text at all. Instead, it casts text as a stream of repeated symbols that have no intrinsic meaning to the algorithms and applies statistics and machine learning to them. That is, it treats words like a set of numbers and uses the same approaches used on numbers. Exemplary NLP tools include vectorization, syntactic analysis, feature analysis, and question answering. The NLP tools are inadequate because they do not scale, cannot meet reasonable timeliness or efficiency objectives, rely largely on supervised learning, and cannot extract meaning from the source data.

Vectorization uses multidimensional models to figure out which words have similar uses by looking at the frequency of their appearance near other words in text. This is a self-learning (clustering) exercise for the computer but requires a significant volume of data.

Syntactic analysis is another way to understand at a local level how various symbols relate to each other. In itself, syntactic analysis does not extract information but helps model relationships across nearby words (e.g., who did what to whom). Syntactic analysis is a supervised learning effort. Human resources must tag a very large set of examples with the desired syntax labels and the algorithms then learn how to extrapolate from those examples into something that handles novel examples correctly. Syntactic analysis, in addition to being expensive in terms of time and data costs, is also challenged by ambiguous language and the lack of a contextual, cognitive backdrop against which an algorithm could make inferences and improve results.

Feature analysis uses machine learning categorization techniques to decide whether a given piece of text falls into a given category (e.g., does this text say something nice about my new product?). Feature analysis also involves supervised learning, meaning that human sources have to tag a very large set of examples with the desired categories. Question answering creates a process through which users interrogate a search engine by asking a question in a natural language rather than typing a list of search terms, and receive what looks like an answer. Question answering is also a supervised learning result that correlates two strings of symbols—the question entered by a user and the documents chosen by the user to read from the presented options.

Other available tools include a pipeline of text search tools including indexing, ontology mapping, entity extraction and resolution, text searching, and regular expression matching. These tools are geared toward organizing data sources and retrieving documents, not toward extracting meaning from the sources. In addition, these tools may demand more time and space than is desirable or efficient, which may lead to less predictable growth planning.

Indexing builds a map from words to the documents in which they appear. Ontology mapping applies a predefined organizational structure of terms to an index or search request. Ontologies are most often hierarchies. The Linnaean system of kingdom, phylum, class, order, family, genus, and species is a common example. Hierarchical ontologies support our goal of handling different levels of abstraction. However, ontologies are most often employed in a predefined, prescriptive manner that does not account for ambiguity or conflicting needs users might have in defining hierarchies or relationships for different types of questions. As a result, ontologies often end up being either too narrow or too generalized to be of great use.

Entity extraction and resolution recognizes that a given word or words represents some type of person, place, or thing. Text searching locates documents through queries that contain some combination of terms, aided by indexing and potentially ontology mapping or entity extraction. However, locating a document that contains terms is not the same as extracting a meaningful object, trait, or relationship. Regular expression matching is a long-standing character-by-character tool that matches a string of characters, including wildcards, and optionally returns some part of the matched string. Regular expressions have significant limits. For example, looking for a collection of terms in undefined order or within a fixed window of terms is difficult for a user to code and brittle in the face of change.

The pipelines of existing tools discussed above are not geared toward adding a layer of meaning that facilitates deriving results. Instead, these tools are geared toward organizing sources and retrieving documents. What is therefore needed is an analytics platform that addresses the shortcomings of these and other analytics products. What is further needed is an analytics platform that efficiently adds a layer of meaning onto text data sources and analytics results.

DETAILED DESCRIPTION

The hybrid analytics platform addresses a range of environments not adequately addressed by prior analytics solutions. For example, these environments rely on narrative text sources; develop, sustain and evolve a world view of objects, traits and relationships; develop, sustain and evolve a way of looking at the world that shapes that word view (i.e., the types of objects, traits, and relationships of interest); operate at multiple levels of abstraction; maintain vigilance, tracking changes in the world view as they occur; and have short response timeframes.

The hybrid analytics platform provides flexible feed and data management, query-based alerting, scoring, and workflow management, collaboration features, a wide range of component-based graphical user interfaces, and an application programming interface (API) set that supports a variety of options for embedding the API into a larger solution. The platform recognizes that queries provide keys to understanding each individual user's world view. In embodiments, the platform translates the evolving view into a data model that casts narrative text into the familiar forms of objects, traits, and relationships that are meaningful to an individual user.

The analytics platform enables subject matter experts to author queries that extract meaningful facts from text and structured sources, to apply query and visualization tools to find and track key objects, traits, and relationships ("OTRs"), and to discover "unknown unknowns" in the environment. The platform also enables business operations to immediately benefit from those findings by incorporating them in the daily workflow, reducing the time and resources required to turn insights into advantage. The platform further enables data scientists to combine the feature engineering and modeling coming from the subject matter experts with the workflow dispositions coming from business operations to validate and further refine decision making within the enterprise and enables information technologists to create efficient text analysis solutions that deliver results without long lead times for training misapplied machine learning techniques.

1 System Architecture and Data Flow 1.1 Modes of Behavior

Figure 1:
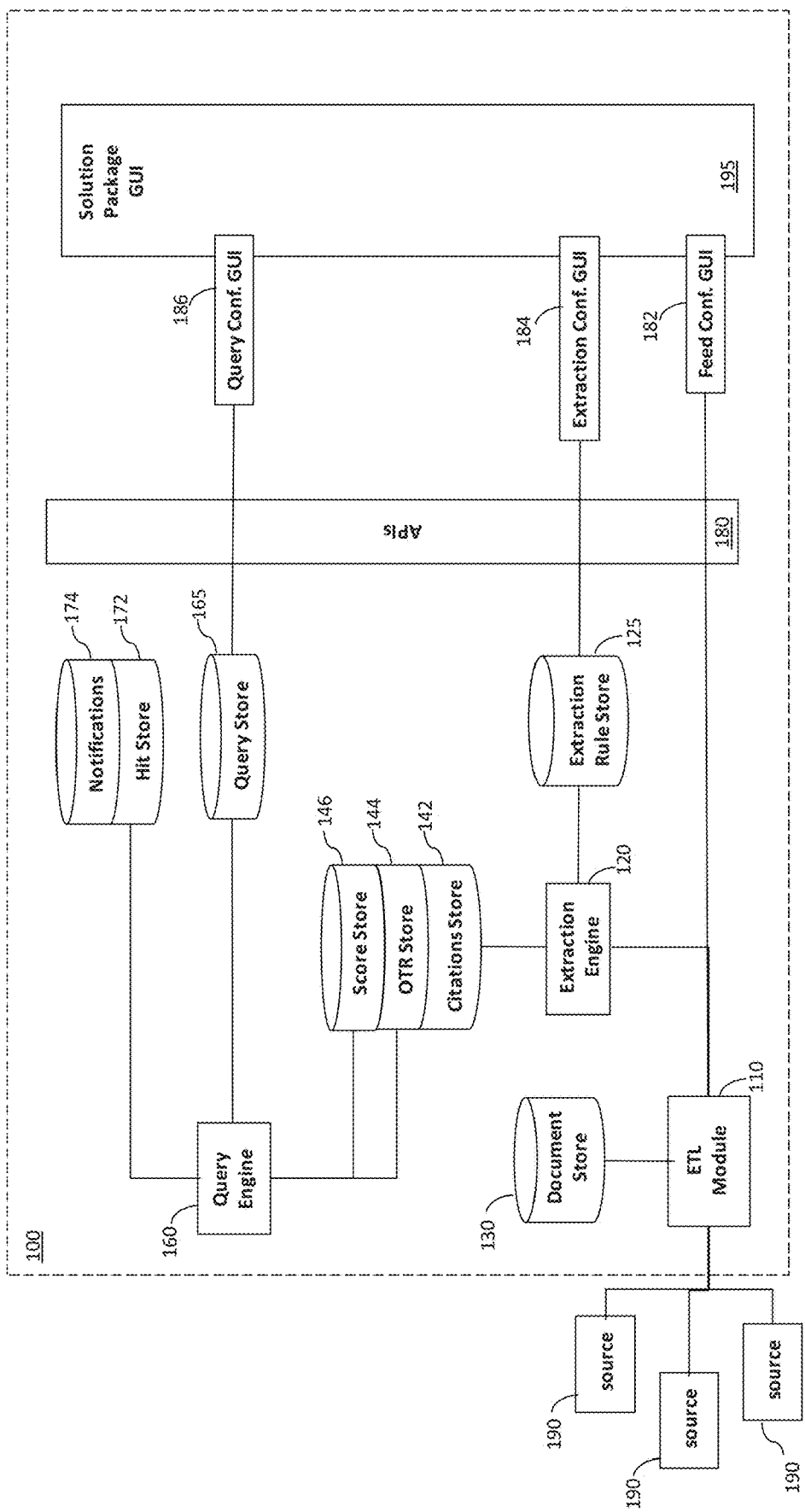
FIG. 1 depicts a block diagram of a hybrid-analytics platform, according to embodiments of the present invention.

FIG. 1 depicts a block diagram of the hybrid-analytics platform 100, according to embodiments of the present invention. The platform is designed to collect structured data and unstructured narrative text; to extract from that data the objects, traits, and relationships (OTRs) of the types that users have expressed interest in via configuration; and to apply user-authored queries to the extracted OTRs to identify patterns. In addition to this "processing mode" of behavior, the platform supports two other modes: configuration mode, in which users and administrators manage the platform's behavior; and access mode in which processed data is made available to users via APIs, Graphical User Interface (GUI) components, and analytics tools. Generally, the platform operates in all three modes simultaneously.

The platform is designed to be agnostic to the analytics problems being addressed. The platform can be tailored to a specific use by loading a "solution package" which is a pre-defined set of feeds, extraction rules, queries, and an application GUI front-end (the solution package GUIs). Users then evolve the solution by defining new feeds, extraction rules, and queries.

1.2 Processing Mode 1.2.1 Collection Components

Hybrid-analytics platform 100 includes extraction, translate, and load (ETL) module 110 and extraction engine 120. ETL module 110 is coupled to one or more sources 190. A source 190 is a provider of electronic textual data including, but not limited to, a file system, database, web service or sensor. Additionally, textual metadata associated with non-textual media is an exemplary source. ETL module 110 collects and reformats documents from one or more sources 190 in support of downstream analysis. Collection across multiple source types enhances the data available for analysis.

Source documents go through a pipeline of collection (e.g., scheduled, manual, or streamed), splitting, merging, and format and content transformation. Scheduled and streaming collection allow near-real time ingestion of relevant sources without user intervention. Splitting, merging, and transforming allow documents to be published in a form consistent with analytic benefit versus being bound to source formatting, type, or timing.

ETL module 110 is coupled to document store 130. In an embodiment, ETL module 110 publishes documents to document store 130. The documents published by ETL module 110 and stored in document store 130 may be newly published documents or updates to previously published documents (referred to herein as re-published documents). Published documents are assigned to one document type (e.g., insurance claim or news article) regardless of their original source(s). Documents of a given type share a document structure, key uniqueness constraints, and an aging policy. Consistent structure within a type simplifies the configuration of extraction rules and provides hooks for help features that explain content to the users. Aging policies tailored for each document type allow less relevant information to be extracted on different schedules, consuming fewer computing resources. In embodiments, the stored documents are sent to external consumers for processing. For example, extraction engine 120 is a consumer of documents in the present architecture. However, as would be understood, other consumers could be used with the present architecture.

Document store 130 provides a long-term repository of source data, organized by document type. Document store 130 segments documents into collections. Exemplary collections include a collection for each published data type, a working collection for documents that have not yet been published, a failure collection for unpublished documents that encountered processing errors, and collections with configuration and synchronization information.

Collection is described in further detail in Section 4.1.

1.2.2 Extraction Components

Extraction engine 120 is configured to execute an extraction process when documents are published and when extraction rules are changed. In an embodiment, extraction engine 120 applies configured rules to extract objects, object traits, relationships between objects, and relationship traits (collectively, "OTR") from fields in the documents passed to it by the ETL module 110 or document store 130, including narrative text fields. The extraction process also generates citations, stored records that identify an OTR, the document that provided it, and the address of the specific text in the document that provided it, for each extraction.

Extraction engine 120 is coupled to citations store 142, OTR store 144, and scores store 146. Citations store 142, OTR store 144, and scores store 146 may be implemented in the same physical device or located in one or more separate physical devices. Alternatively, one or more of citations store 142, OTR store 144, and scores store 146 could be co-located on the same physical device as document store 130. Citations store 142 provides a history of each OTR extracted from a document. A given OTR often appears in multiple documents. Downstream analysis is based on OTRs, not documents or citations, allowing new citations of old OTRs to be ignored in downstream processing. This approach reduces the resources required for processing and reduces the distraction of users who are primarily focused on new OTRs, not new reporting. Access to citations as part of workflow gives users the ability to review the source documents behind a given OTR, to independently assess the confidence of an OTR, and to review adjacent text and data for other unextracted OTR of value. Deletion of a document can lead, through citations, to deletion of the OTR cited only by that document.

OTR store 144 maintains the extracted objects, object traits, relationships, and relationship traits, making them available for direct view, search, and pattern recognition. In embodiments, OTR Store 144 is a Structured Query Language (SQL)-supporting relationship database. In these embodiments, the data schema is a meta-schema. Rather than a table of a given object type, with columns corresponding to configured traits and join tables for relationships, the database contains a table of objects, with all types combined, and additional metadata per column that identifies its object type. Other OTRs are structured in the same way. Extraction of OTRs into a common relational database allows rapid integration with internal and external features. The use of a meta-schema allows new object types, object trait types, etc., to be configured without requiring resource-intensive and error-prone database migrations and allows the OTR store to maintain conflicting values for the same trait types.

As described in the next section, queries are applied to the OTR store to identify objects that meet given criteria. Queries can be configured to modify the objects on which they hit by changing a "score" trait on the hit objects. Scores store 146 maintains the aggregate scores on objects, as set and adjusted when those objects are hit by scoring queries. Users can configure multiple types of scores on a given query.

Extraction is described in more detail in Section 4.2.

1.2.3 Query Evaluation Components

Queries are distinct from extractions. Extractions take narrative text and other source documents as input and generate OTRs and citations. OTRs, in turn, become the input to queries, which run persistently on the platform and identify patterns, relationships, and events of interest to users. This allows query engine 160 to apply queries to search for conditions that can only be met by combining information from multiple documents.

OTR store 144 and score store 146 are coupled to query engine 160. A query is a search for objects of a given type or types that satisfy a set of requirements expressed in terms of traits and relationships. Most queries in the platform are persistent.

Query engine 160 is coupled to query store 165. After a user defines a query, it is maintained in query store 165. Every time data in OTR store 144 changes, all queries that may be hit or cease to hit on the changed OTRs are applied to the changed data. Hits against objects that have not previously hit on the query are recorded in the hit store 172. Existing hits that are no longer valid are removed.

Query engine is further coupled to hit store 172 and notification store 174. A change in hit store 172, that is, a new or removed hit against a query that happens as result of processing new data and generating new OTRs, can in turn trigger two types of behavior: notification and scoring. A notification may be sent to a user whenever a new hit on a given query is recorded, if the user has previously subscribed to notifications on that query. These notifications are stored in notification store 174. In addition or alternatively, a score attribute on an object may be modified in the score store, when the object first hits a query that has an associated scoring rule, defining the score attribute (object trait) to change and the amount by which to change it.

Query evaluation is described in further detail in Section 4.3.

1.3 Configuration Mode

Hybrid analytics platform 100 further includes a set of APIs 180 and GUI components (182-186) to configure ETL module 110, extraction engine 120, and query engine 160. The configuration components are described in further detail below.

1.3.1 ETL Module Configuration Components

Via APIs or GUIs, administrators can at any time configure the behavior of ETL module 110 to manage the collection, formatting ("publication"), and dissemination of feeds. In an embodiment, ETL module 110 is coupled to a feed configuration GUI component 182 via an API 180. Administrators can also define the structure of published document types, and rules for defining the analytic priority of documents.

The process of feed configuration is described in further detail in Section 2.1.

1.3.2 Extraction Engine Configuration Components

The types of extractions that can be made fall into two broad categories: field extractions and text extractions. Field extractions are made by simply reading the entire value from a structured field. Text extractions are made by applying complex text matching rules to a structured field containing text, or an unstructured narrative text block. Field extractions are configured as part of configuring document types, as previously described. Text extractions are configured as below.

Extraction engine 120 is coupled to an extraction rule store 125. Extraction rule store 125 stores the interdependent rules that may apply to the text to be searched by the engine. One type of rule supported by the present invention is an extraction rule which is described in further detail in Section 2.2.3.1.

In embodiments of the present invention, extraction engine 120 and extraction rule store 125 are coupled to extraction configuration GUI component 184 via an API 180. Extraction configuration GUI component 184 is configured to configure OTR types supported by the extraction engine and the extraction types supported by the extraction engine. The types of extractions that can be made fall into two broad categories: field extractions and text extractions. Field extractions are made by simply reading the entire value from a structured field. Text extractions are made by applying complex text matching rules to a structured field containing text, or an unstructured narrative text block 1.3.2.1 OTR Type Configuration Via APIs or GUIs such as the extraction configuration GUI component 184, administrators and users can at any time define new types of objects, traits, and relationships that may be extracted. Every object is of a given object type, e.g., person, company, resource. Every object trait is of a given type of trait on a given type of object, e.g., a person's eye color, a company's industry sector, or a resource's value. Every relationship is of a given type against two objects of a given type, i.e., an employment of a person by a company. Every relationship trait type is of a given type on a given relationship type, e.g., a duration of the employment of a person by a company.

The OTR types in the platform provide a way to normalize extracted data into a form that can be queried and accessed in a manner familiar to users. OTR types are often created as a by-product of configuring a new extraction.

The process of OTR type configuration is described in further detail in Section 2.2.1.

1.3.3 Field Extraction Configuration

An administrator can at any time define the OTR types that may be extracted from any given field in a structured document using extraction configuration GUI component 184 via an API. For example, a given object trait type of "person's age" could be associated with multiple fields in multiple document types. One OTR type configuration can be used in multiple field extraction configurations.

The process of field extraction configuration is described in further detail in Section 2.2.2.

1.3.4 Text Extraction Configuration

Text extraction is driven by two separate types of exemplary configurations which are interdependent. In the first configuration, text extraction is driven via APIs 180 or GUI components through which users and administrators can at any time create, modify, or remove text extraction rules, based on complex matching criteria. These first configurations define how strings of text are recognized as extracted OTRs. In the second configuration, text extraction is driven via APIs or GUI components through which administrators can at any time define which sets of text extraction rules can be applied to which structured text fields of which document types and which unstructured text document types. That is, the second configurations define where in documents the extraction rules from the first configuration should be applied.

Section 2.2.3 describes the process for configuration of the extraction engine for text extraction in further detail, including the features of text extraction rules, how they are applied differently to objects, traits, and relationships, and the process through which configuration changes are made.

The text extraction rules stored in extraction rule store 125 must be periodically compiled into images which can be used by extraction engine 120. Compilation can be triggered by several different events, including stored schedules, user requests to test text extraction rules, and administrator action. Compilation is described in further detail in Section 3.

1.3.5 Query Engine Configuration Components

Query engine 160 is coupled to query configuration GUI component 186 via an API. The configuration of query engine is driven via APIs or GUIs through which users and administrators can at any time create, modify, or remove persistent queries. Queries are built by stringing together a set of conditions based on OTR types and values. When configuration is performed via the query configuration GUI component 186, users are guided to build queries from existing OTR types or, when a needed OTR type is lacking, to define it through OTR Type Configuration as part of query configuration. Users and administrators can at any time create, modify, or remove notification subscriptions and scoring rules associated with a query.

The process of query engine configuration is described in further detail Section 2.5.

1.3.6 GUI Configuration Components

As illustrated in FIG. 1, in embodiments of the invention, a solutions package GUI includes one or more GUI components. GUI components display or edit one type of resource from the platform, including data (e.g., object, object trait, relationship, relationship trait, document, citation, query hit, and notification) and configuration (e.g., object type, object trait type, relationship type, relationship trait type, object type anchor, object trait type anchor, relationship type anchor, relationship trait type anchor, object match, trait type match, relationship type match, relationship trait type match, query, query subscription, and query scoring rule). Although FIG. 1 depicts only the configuration components, other types of GUIs can be incorporated into a solution. Via development, GUI components are embedded with the platform to incorporate platform access features into existing web-based applications, or to create new, stand-alone web-based applications.

The process of GUI configuration is described in further detail in Section 2.6.

1.4 Access Components

Platform 100 includes a set of APIs to provide controlled access to data in the stores. The process supporting the API provides functional access control, data access control, and audit logging. API-based access is described in further detail in Section 5.1.

Every type of stored resource on the platform has supporting API endpoints and has one or more corresponding GUI components that "front" the data pulled from those endpoints. Most resource GUI components support a single view, a summary list view, and edit views. Some have additional display options, such as a network chart view. The input for each generic component can be wired to read or write named data in the client browser, allowing data to be shared across components and for changes in data to trigger component behavior. For example, the user's selection of an object from a list can trigger the update of a citations list to focus on citations of that object and trigger a change in the center of a network graph. GUI-based access is described fully in Section 5.2.

2 Configuration Mode

The configuration processes described in each subsection below are independent and can be carried out at any time by any user and/or administrator.

2.1 ETL Feed Configuration 2.1.1 Feed Workflows

Figure 2:
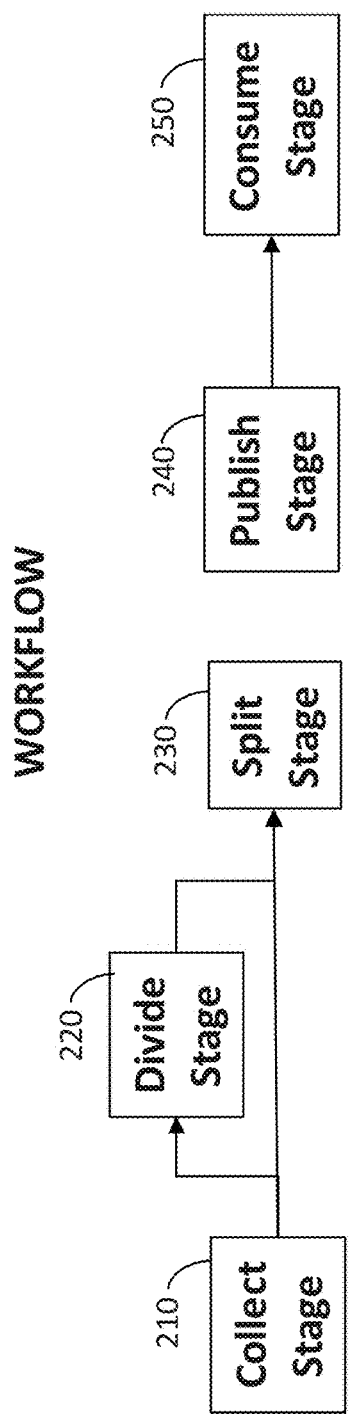
FIG. 2 depicts an exemplary workflow for configuration of a feed.

During ETL module configuration, one or more document feeds are configured. In an embodiment, each feed is configured by the definition of a workflow. A workflow is defined to collect from a given source and produce a set of documents of a given document type. A workflow, illustrated in FIG. 2, includes a sequence of stages in which configured actions run. In an embodiment, ETL module 110 provides a number of predefined standard actions for each stage which are immediately available for use in a workflow. Additionally, local custom actions can be developed to tailor behavior to local needs. Like standard actions, each local custom action is designed to fulfill one phase of ETL workflow through new behavior. Local custom actions are created in a development process using a Software Development Kit (SDK), tested, and deployed to the ETL module where they then become available to administrators for use in workflows. ETL module 110 also exposes support libraries for each stage to simplify the development of custom actions and make all actions behave more consistently. Each support library has its own set of configurable items. When a developer includes support libraries in a custom action, ETL module 110 automatically presents the same configuration interface for those items and presents the same data API to the developer of the action. To configure a workflow, the administrator selects one or more action for each stage and configures each action in turn.

The workflow includes a collect stage 210 and a publish stage 240. The collect stage 210 pulls data in from an external source on a schedule or on demand. Collect actions deal with how data is transmitted into or pulled by the platform versus its content. Exemplary configurable parameters supported by collect actions are listed in the following table.

| Parameter | Type | Meaning |
|---|---|---|
| Schedule | cron string | Collect automatically at these times. |
| Archive | flag | Save raw output in a separate archive store. |
| Decompress | flag | Unzip incoming files. |
| Extract | flag | Extract incoming files from a tar, tgz, or zip file. |
| Extract Filter | string | Only extract files whose names match this pattern. |
| Threads | integer | Collect from source using this many parallel threads. |
| Dropbox Enabled | flag | Allow files received over the dropbox API to be treated as output of this collect action. |

Standard collect actions include, but are not limited to, File Transfer Protocol (FTP) and Secure FTP (STP), Hypertext Transfer Protocol (HTTP) and HTTP/Secure (HTTPS), Real Simple Syndication (RSS), Open Database Connectivity (ODBC), Oracle, Postgres, MySQL, Search Engine, TAC, WSDL, Queue, and Stream. Exemplary collect support libraries and their associated configurable parameters are listed in the following table. In addition to the configurable items supplied by the support libraries, the HTTP and HTTPS action also include a configurable deduplicate content item.

| Name | Configurable Parameters |
|---|---|
| FTP | Host, port, directory path, filename pattern, anonymous, username, password, passive mode, maximum transfer, open timeout, read timeout, delete on put, collection threads |
| SFTP | Host, port, directory path, duplicate put directory paths, filename pattern, username, password, key, maximum transfer, delete on put, collection threads |
| HTTP | url, method, fields, headers, username, password, certificate, key, key password, proxy url, proxy username, proxy password, follow redirections, allow https-to-http, |

-continued

| Name | Configurable Parameters |
|---|---|
| RSS | connect timeout, receive timeout, send timeout, host whitelist, host blacklist, mimetype whitelist, mimetype backlist, multiple pages, max pages Max items, link field, content field, collect link, additional fields, full content, description no content, passthrough, link pattern |
| ODBC | connection string, query |
| Oracle | connection string, query |
| Postgres | connection string, query |
| MySQL | connection string, query |
| Search Engine | url, search string, search scope |
| TAC | entity id, start timestamp, end timestamp |
| SOAP | wsdl, endpoint, parameters |
| Pretty Good Privacy (PGP) | key |
| Decompress | n/a |
| Extract | n/a |
| Ssh | Host, port, username, password, key, timeout, command |

The publish stage 240 sets the document type based on configuration or content, determines a unique identifier for the document based on configuration or content, reformats the content of the document into a structure appropriate for its type, and performs any merges or rewrites required if this is a new version of an existing document. Publish actions take a collected and potentially split document and reformat it, and potentially merge it with an older version of the same document. Exemplary standard publish actions, their associated support libraries, and any additional configurable items that are not supplied by support libraries are provided in the following table.

| Name | Support Libraries | Additional Configurable Items (not supplied by support libraries) |
|---|---|---|
| Hash | Field Map | |
| JSON | Field Map | |
| HTML | HTML | |
| PowerPoint | PowerPoint | |
| Excel | Excel | |
| Word | Word | |
| PDF | PDF | |
| Text | | |
| XML | XML, Field Map | |
| News Markup Language (NewsML) | XML HTML Document Attributes | HTML nodes, extract after, extract until, exclude, ignore CDATA, force breaks, unescaped html, preserve hyperlinks |

Exemplary publish support libraries and their associated configurable parameters are listed in the following table.

| Name | Additional Configurable Items (not supplied by support libraries) |
|---|---|
| Field Map | document ID from, document title from, document copyright from, document timestamp from |
| Doc Attr | |
| HTML | Extract after, Extract until, exclude, ignore CDATA, force breaks, unescaped HTML, preserve hyperlinks |
| PowerPoint | |
| Excel | |
| Word | |
| PDF | |
| XML | Html nodes, repeated element name |

A workflow may optionally include a divide stage 220, a split stage 230, and/or a consume stage 250. The divide stage 220 is invoked when a collected item is too large to store as a single unit, based on the capabilities of the document store. Divide actions break extremely large, collected files that are made up of separable items (like rows in a comma-separated values (CSV) file) to be broken into smaller chunks to allow parallel processing on the content. Exemplary divide actions include CSV, JavaScript object notation (JSON), extensible markup language (XML), PowerPoint (PPT), Excel (XLS), Word, portable document format (PDF), and plain text. Exemplary divide support libraries and their associated configurable parameters are listed in the following table.

| Name | Additional Configurable Items (not already supplied by support libraries) |
| --- | --- |
| CSV Divider | size per part, column separator, row separator, quote character |
| JSON Divider | Source encoding, size per part, divide target |
| XML Divider | Size per part, xml element |
| PPT Divider | size per part, slides per document, ignore graphics |
| XLS Divider | size per part, sheets per document |
| Word Divider | Size per part, pages per document, sections per document |
| PDF Divider | Size per part, pages per document |
| Text Divider | Size per part |

The split stage 230 divides a collected document into many subdocuments. Split actions take aggregate documents and break them into smaller documents. For example, a database query result or CSV file can be converted so that every row becomes its own document or a PPT file converted so every slide is a document. This technique is employed when the analytic requirements of the users are better served with separate documents than the original aggregate view. Standard split actions include CSV, JSON, XML, PPT, XLS, Word, PDF, and Text. Exemplary split support libraries and their associated configurable parameters are listed in the following table.

| Name | Additional Configurable Items (not already supplied by support libraries) |
| --- | --- |
| CSV Splitter | Column separator, row separator, quote character, headers, non-standard rows |
| JSON Splitter | Split target |
| XML Splitter | Repeated element name |
| PPT Splitter | Slides per document, ignore graphics |
| XLS Splitter | Sheets per document, headers |
| Word Splitter | Pages per document, sections per document |
| PDF Splitter | Pages per document, sections per document |
| Text Splitter | Bytes per document |

The consume stage 250 may send a newly published or re-published document and/or additional information to one or more recipients other than document store 130. The associated consume actions deliver newly published or re-published documents to external systems, other than the document store. Exemplary standard consume actions, their associated support libraries, and any additional configurable items that are not supplied by support libraries are provided in the following table.

| Name | Support Libraries | Additional Configurable Items (not supplied by support libraries) |
| --- | --- | --- |
| FTP | FTP | |
| SFTP | SFTP | |
| REST | | Methods, fields, host whitelist, host blacklist, filetype whitelist, filetype blacklist, mimetype whitelist, mimetype blacklist, multiple pages, max pages, follow redirects, all https to http |
| Tacball | SFTP Tacball Templating | template |

Exemplary consume support libraries and their associated configurable parameters are listed in the following table.

| Name | Additional Configurable Items (not supplied by support libraries) |
| --- | --- |
| FTP | Host, port, directory path, filename pattern, anonymous, username, password, passive mode, maximum transfer, open timeout, read timeout, delete on put, collection threads |
| SFTP | Host, port, directory path, duplicate put directory, filename pattern, username, password, key, maximum transfer, delete on put, collection threads |
| Tacball Templating | Feed, source, type, attach original file, docid prefix template |

In an embodiment, the collect, divide, and split actions are individually configured to flag their output as "ready" or "working." A "ready" document has completed its current stage in the workflow and is ready for the next action. A "working" document remains in its current stage. This configuration allows a collected document to sit and wait for other collected documents to contribute to it, effectively providing a way to use repeated collect actions on the same document to merge multiple inputs from roughly the same time period into one resulting document.

2.1.2 Document Types

Before defining a workflow, an administrator may define, via APIs or GUIs, a new document type. When an administrator creates a new document type, which may or may not require the development of a custom publish action in ETL module 110, the structure of the document type is established. In an embodiment document structure is represented as an addressable nested hash. A nested hash is a hash object that may contain other hashes, arrays, or simple fields as elements. Hashes and arrays can be recursively nested, terminating in simple fields. A nested hash is "addressable" when the keys for the element are consistent, allowing for reference to a specific field. For example, the address "claim/insured_party/date_of_birth" may indicate a date field within a hash called "insured_party" nested within a hash called "claim". An array element is addressable by its index: "claim/participants/4/date_of_birth" to access the $4^{th}$ participant's date_of_birth, or "claim/participants/*/date_of_birth" to refer to any participant's date of birth.

For any given document type, rules on the analytic priority of documents of that type may be defined. The analytic priority can be used in later processing to determine which documents should be processed first, e.g., which documents should be sent to the extraction engine first when new extraction rules are defined.

Each analytic priority rule for a given document type produces a number indicating priority. The rule is an if-then statement based on any addressable field or fields in the document type, including metadata such as the publication timestamp of the data, Boolean operators and simple functions such as "today( )". For example, in document type of "insurance claim":

if (("claim_info/status"="closed") and (today( )-"claim_info/status_date" >30))
        priority=2
    else
        priority=1

2.2 Extraction Engine Configuration

The platform can extract OTRs based on many extraction rules in parallel. An extraction rule is used by the extraction engine to scan text and identify the appearance of a given OTR. The extraction rule specifies the type of OTR to be extracted. OTR types are configured as described in Section 2.3. Configuring text extraction involves receiving a request to add or change an extraction rule, parsing and validating that rule, and compiling a set of rules together into one image or "rule library" which is applied as a unit to a given piece of text during processing.

Figure 3:
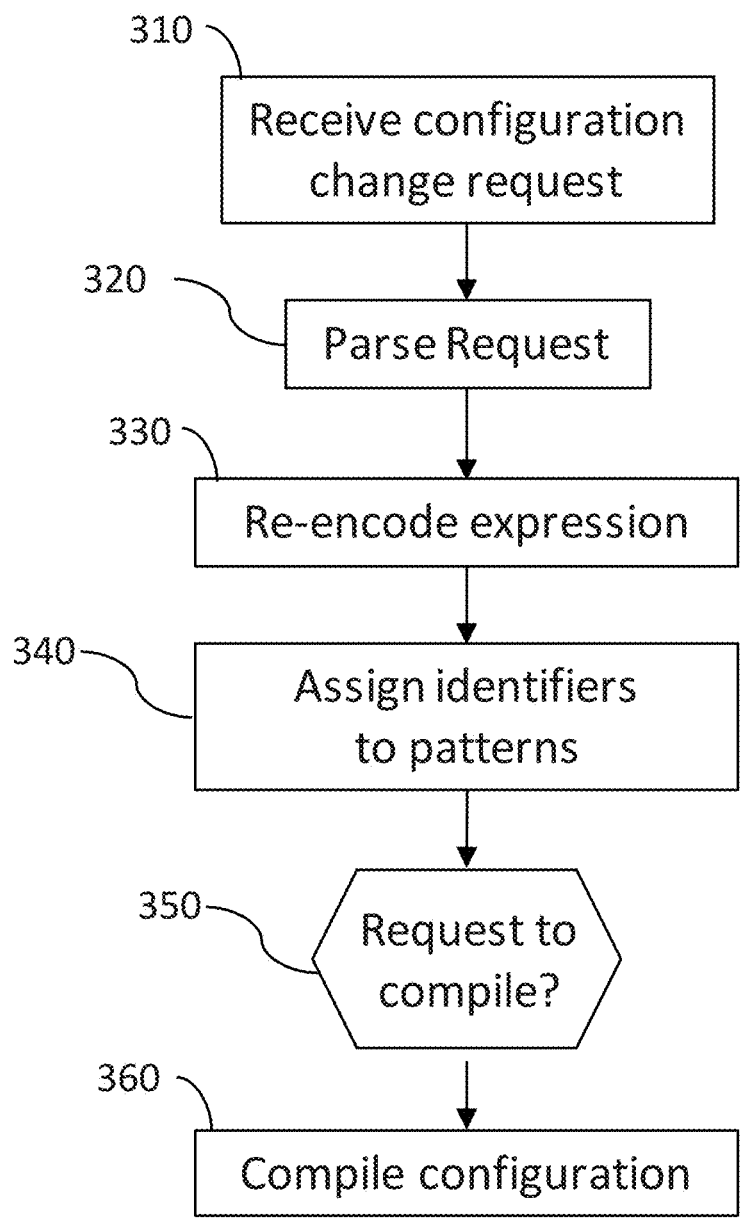
FIG. 3 is a flowchart depicting the extraction engine configuration process for text extractions, according to embodiments of the present invention.

FIG. 3 is a flowchart depicting the extraction engine configuration process for text extractions, according to embodiments of the present invention. The extraction engine configuration process starts with step 310 in which a request to create a new rule library is received by extraction engine 120. A rule library is a collection of OTR text extraction rules that should be applied as a set to a given block of text during a search. Example rule libraries might be "the 2021-06-05 production set" or "test set 123". The request much contain a name for the library that is not already in use. Rule libraries are described in further detail in Section 3.1. The text extraction engine can support multiple libraries at one time in order to support different searches against multiple libraries at the same time.

In step 310, a request to change the configuration of extraction engine 120 by adding a new extraction rule to a given rule library stored in rule store 125 is received. Extraction rules are described in further detail in Section 2.2.3.1. A configuration request includes a library name and the appropriate information for the given type of extraction as described in the previous section.

In step 320, extraction engine 120 parses the request to change the extraction engine configuration. As part of the parsing process, engine 120 validates the syntax of the extraction rule expression and enforces a set of defined validations. Exemplary validations include that no pattern can match less than a pre-defined number of characters (e.g., three characters); Boolean expression "PATTERN or PATTERN" must be replaced with PATTERN|PATTERN, making the alteration a pattern evaluation rather than a predicate evaluation; and WITHIN operations must be nested such that outer WITHIN operations always have a larger window than inner WITHIN operations.

After passing syntax checking and validations, in step 330, the engine re-encodes each expression to allow patterns to be evaluated independently. The following example illustrates re-encoding.

Input expression: within 1 paragraph(
      (within 4 words(
        (/mi(ch(ae|ea)|ke)/ and /smith/ and not /australia/)
    Patterns: /mi(ch(ae|ea)|ke)/ (becomes ARG1)
      /smith/ (becomes ARG2)
      /australia/ (becomes ARG3)
    Predicate: within 1 paragraph((within 4 words(ARG1 and ARG2) and not ARG3)

The parser then assigns each pattern a unique identifier in step 340. If the same pattern appears in two different rules, the pattern is assigned two different unique identifiers. In the compilation described in Section 3, the patterns from the expression are added to the pattern tree, the predicates are added to the predicate set, and mapping is established to connect them. If the rule did not pass validation, the parser returns an error message. Otherwise, a confirmation of success is sent.

In step 350, after all rules for a given library have been configured, a separate request to compile the configuration is expected. If the request for configuration change also included an instruction to compile, extraction engine 120 compiles the configuration in step 360 by relating rule books in a library based on user library configuration requests. After compilation, as described in Section 3, the configuration is available for the extraction phase.

2.2.1 OTR Type Configuration

The configuration of field extractions and text extractions, as described above, address how to map the contents of a document into specific types of OTRs, e.g., "person", "person's eye color", "person's spouse". OTR Types are categories that reflect users' mental model of subject matter. Exemplary OTR types are described below. Rather than being hardcoded, new OTR types can be defined at any time via the appropriate APIs and GUI components such as extraction engine configuration GUI component 184.

2.2.1.1 Objects and Object Types

An object is a single instance of an object type (e.g., "person"). An object is made unique within an object type by an identity value (e.g., "social security number 123-12-1234"). An object has a collection of traits (e.g., "has blue eyes", "was born on Jul. 4, 1976", "likes chocolate") which may be conflicting (e.g., "has blue eyes" and "has brown eyes"). An object also has a collection of relationships to other objects (e.g., "is brother of Fred", "works for Acme") and has supporting metadata including a display name and a description.

An object type is a uniquely named category of objects (e.g., "person"). The object type definition includes the data type of the identity of objects of this type (e.g., the identity which is a social security number is of type "string").

2.2.1.2 Object Traits and Object Trait Types

Like an object, an object trait is single instance of an object attribute (e.g., Mary's eye color is blue), associated with a specific object, and is made up of a trait type (e.g., eye color) and value (e.g., blue). An object trait supports values of various types including but not limited to Boolean, integer, float, string, date, time, datetime and geographical location.

An object trait type is a named attribute class of a specific object type (e.g., person's eye color). An object trait type defines the data type of its value (e.g., timestamp for date_of_birth). Optionally, a trait type can define an override value that becomes an extracted trait's value whenever the extraction succeeds (e.g., override eye color value with "grey" when "grey", "gray", or "GRY" is matched). The object trait type has supporting metadata including a display name and description.

2.2.1.3 Relationships and Relationship Types

A relationship is a single instance of a relationship (e.g., "Alice is the sister of Betty"). A relationship is associated with two specific objects and is of a specific relationship type.

A relationship type is a named association between two object types. A relationship type is identified as symmetric if the two object types are the same and A-relationship-B implies B-relationship-A (e.g., A is married to B). A relationship type has supporting data including a display name and a description.

2.2.1.4 Relationship Traits and Relationship Trait Types

A relationship trait is a single instance of a relationship attribute (e.g., the start date of Mark's employment relationship with Acme was in 1999). A relationship trait is associated with a specific relationship between two objects. A relationship trait is made up of its type (e.g., start date) and its value (e.g., 1999). Supported value types include but are not limited to Boolean, integer, float, string, date, time, datetime, and geographical location.

A relationship trait type is a named attribute class of a specific relationship type, e.g., person-employed-by-company's start date. A relationship trait type defines the data type of the value and optionally defines an override value that becomes an extracted trait's value whenever the match succeeds. A relationship trait type has supporting metadata including a display name and description.

2.2.2 Field Extraction Configuration

In addition to extraction by scanning for patterns in text, the platform can extract OTRs by simply copying the value found at a specific addressable field in a document. Many field extractions can be performed on the same document in parallel, at the same time text extractions are being performed.

Field extractions are rules which define a mapping from an addressable field or hash within a document type to a specific OTR type (e.g., a person's age can be found at/member/age in the biography document type). Field extractions differ from text extractions, described in the next section, in that no text pattern matching is required to extract data. The entire value at the given field address is considered the value of the extraction.

The way data is structured in a document implies associations between fields that must be accounted for when configuring field extractions. Consider this exemplary structure:

```
organization: {
  name: Acme,
  departments: [
    {
      name: "Accounting",
      staff: [
        {
          name: "Chris Able",
          position: "manager",
          age: 43
        },
        {
          name: "Pat Baker",
          position: "auditor",
          age: 31
        }
      ]
    },
    {
      name: "Sales",
      staff: [
        {
          name: "Leslie Cole",
          position: "floor manager",
          age: 22
        }
      ]
    }
  ]
}
```

To correctly associate each staff roster to its department in the above example, each hash at the addressable location/organization/departments/* has to be recognized as a related set of information. Similarly, to associate each staff member's age with the correct staff member, each hash in/organization/departments/*/staff/* has to be recognized as a related set.

OTRs have a parallel structure that can be mapped to document structure. A hash may represent a collection of information about an object (e.g., a staff member). Elements within that collection may represent traits of that one object (e.g., age of a staff member). Relationships may be inferred between a hash and another hash nested within it (e.g., a staff member working within a department), or between peer hashes (e.g., two staff members being colleagues).

As part of the extraction configuration process, anchors are defined for the object type, object trait type, relationship type, and relationship trait type anchors via the appropriate APIs and GUI components such as extraction engine GUI component 184. Within the platform, an anchor defines an association between an addressable location in a document and the OTR type that can be extracted at that location. Since OTR types are hierarchical, anchors definitions are as well.

An object type anchor defines the addressable location of a block within a structured document type in which an object of the given type and supporting traits and relationships can be extracted. The anchor definition must also include the address within the block of the field containing the object's identity. The object type anchor may also optionally define, for the case when a field match is made and the object does not yet exist, the relative address to the display name of the new object. For example, if a new social security number is pulled from the SSN field, the display name for the object can be pulled from the name field. The object type anchor indicates whether exactly one object is expected to be found, or many can be found and whether the object should be extracted if there are no traits or relationships extracted from the block.

In embodiments, the object type anchor also optionally defines a filter expression, which is a Boolean statement evaluated against the elements in the block, which determines whether the object should be extracted. If, for example, the block contains information about a party to an insurance claim, a filter can be defined to only extract person objects from the block if the party_type field contains 'service provider', 'medical service provider', or 'attorney.' The configuration of an object type anchor may also contain a description.

An object trait type anchor associates an addressable field in a document with a specific object trait type. The field must be within an anchored object type block of the correct object type. The configuration of an object trait type anchor may also contain a description.

A relationship anchor must refer to two anchored object type blocks which are nested one within the other, or sibling elements within a surrounding block. The relationship type may be specified in the configuration, being based on the document structure's meaning, or may be extracted from a field in one of the two object blocks. The configuration of a relationship type anchor may also contain a description.

A relationship trait type anchor must reference a relationship anchor and provide an address to the field within one of the two object blocks containing the trait to be extracted. The configuration of a relationship trait type anchor may also contain a description.

2.2.3 Text Extraction Configuration

Text extraction configuration involves the definition of text extraction rules. These rules have features that apply universally to OTRs, and additional features specific to object extractions, object trait type extractions, relationship type extractions, and relationship trait type extractions, as described below.

2.2.3.1 Text Extraction Rules

A text extraction rule defines how a string of text can be recognized as a reference to a specific OTR type or specific object. Text extraction rules work in tandem with a set of OTR anchors, which indicate where in a body of text a given extraction rule should be applied, as described in the previous section.

Figure 4:
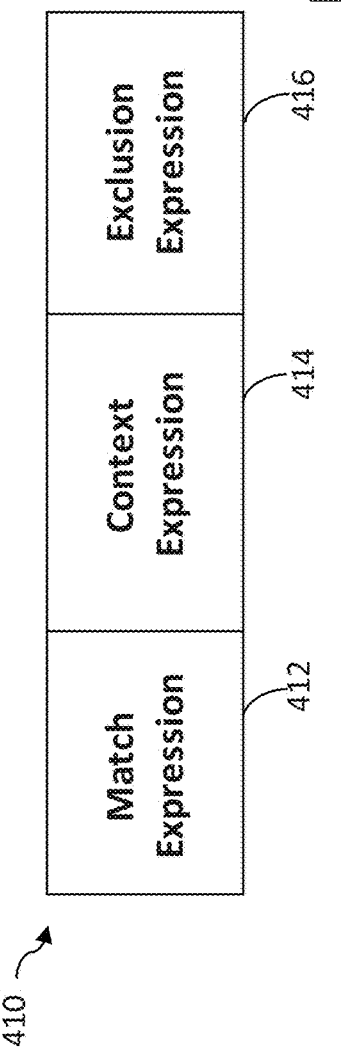
FIG. 4 depicts an exemplary text extraction rule.

All text extraction rules share a common set of features. An exemplary text extraction rule 410 is illustrated in FIG. 4. Text extraction rule 410 comprises three exemplary expressions—the match expression 412, the context expression 414, and the exclusion expression 416. A match expression is required in an extraction rule. However, in embodiments, the context and exclusion expressions are optional. The match expression targets the specific text of interest (e.g., "MT-123" as the name of a missile). The context expression targets clues in the text that confirm that the located match is relevant (e.g., a set of terms indicating the text is about missile versus plumbing supplies with the same name). The exclusion expression is similar to the context expression, but targets clues in the text that confirm the located match is not relevant. An extraction rule is considered to "hit" the text being evaluated if the match expression evaluates to true, the context expression, if present, evaluates to true, and the exclusion expression, if present, evaluates to false. When a rule hit is detected, the extraction engine 120 is configured to record the "hit" in a report indicating the location of the start and end of the searched text on which the rule encountered a hit. As would be appreciated by those skilled in the art, other types or expressions can be integrated into an extraction rule.

Any of the match, context, or exclusion expressions may include one or more patterns, Boolean operators (e.g., AND, OR, NOT and parentheses), windowing, ordering, and chaining, i.e., referencing hits against other match rules in the same text. A pattern is a description of one or more strings in a block of text to match. A pattern may consist of any combination of simple characters (e.g., 'a', '7', '*', ' ', newline, or any other character, including Unicode (UTF-8) characters) that match one-for-one with characters in text, alterations that allow choices, or options that allow a given character or string to either be present or not. Alterations may be denoted with the symbol "|". For example, the pattern mi(ch(ae|ea)|ke matches michael, micheal, or mike. Options may be denoted with the symbol "?" (e.g., mic (rophone)? Or colou?r). In an embodiment, a pattern is denoted within slash characters (e.g., /joe/, /dog/).

Windowing indicates specific portions (brackets) within the source material for a match to succeed (e.g., words, sentences, or paragraphs). In an embodiment, windowing is expressed using WITHIN operators (e.g., WITHIN 1 PARAGRAPH (/joe/ AND /smith/), WITHIN 4 WORDS (/dog/ AND /Labrador/), etc.). Ordering requires sub-expressions to hit in a specific order in a block of text. In an embodiment, ordering is expressed as IN ORDER operators. The following example combines patterns, Boolean operator, windowing, and ordering:

within 1 paragraph (within 4 words(in order(/joe/, / smith/)) or /bud/) and not /Australia/)

An expression "hits" wherever the text contains characters strings that match the patterns and satisfy the Boolean, windowing and ordering requirements of the expression.

A single extraction rule helps recognize a single concept in text. However, many text extraction tasks are more complex, requiring the extraction of many interdependent concepts from the same text. These interdependencies come from the nature of information conveyed in text. As an example, a user may use extraction to identify a set of entities or objects in the text, traits associated with specific identified objects, and relationships among objects. However, writing a single extraction rule for every pair of object and trait, or trio of object, related object, and relationship would be combinatorically infeasible.

To address these limitations, embodiments of the present invention introduce a "chaining" feature, which separates rules into different groups by object type and apply the groups in phases: all object rules for a given object type are grouped, all object trait rules for traits of a given object type are grouped, and so on. To be meaningful, the extracted traits must be attributed to a specific object. If the object and trait are to be extracted from the same block of text, the trait extraction rule must be clear on how to associate the extracted trait with the correct extracted object, since there may be more than one object mentioned in the text. The trait extraction rule, however, does not have to specify the exact object, only the object type. For example, a trait rule to extract the eye color of an object of type PERSON could be expressed as:

within 1 sentence(@{PERSON} and /(blue|green|brown) eyes/) where @{PERSON} stands in for any match of a person object. In this way, the trait extraction rule is decoupled from specific people and solves the combinatorics problem above.

As a further example, a group of rules to extract relationships between people and companies, e.g., an employment or customer relationship can be defined. Similar to traits, a rule can be written to refer back to the object types PERSON and COMPANY rather than to specific objects, for example, within 1 sentence(@{PERSON} AND @{COMPANY} AND/is employed by|works (for|at)/))

Groups of rules are chained together in an order for application (evaluation). A group of rules can be evaluated with no dependencies, such as objects, and is considered a "zeroth-order" group. A group of rules requiring one set of hits to be included in the evaluation, such as trait rules requiring a set of object hits, is a "first-order" group. A group of rules requiring two sets of hits to be evaluated, such as relationship rules requiring two object lists, is a "second-order" group, and so on. Any group can serve as the input to another group, regardless of order. For example, a second-order group generating relationship hits (e.g., employment) can be the input to a first-order group that generates relationship trait hits (e.g., duration of employment).

Restrictions can be imposed on the chaining for groups. Two mandatory restrictions on the chaining of group are that (1) every n-order group must have n inputs and (2) there can be no loops. That is, the network graph created by the groups as nodes and output-input relationships as arcs must be acyclic. In embodiments of the present invention, additional restrictions can be defined and applied to the chaining process.

In addition to the features above, each type of text extraction has its own features, as described below.

Object-Related Extractions

An object match is a rule that defines how different expressions in text can be mapped back to a given object (not object type). Extracting an object based on match rules versus just by its identity allows a wide range of expressions to be recognized as a single object (e.g., multiple spellings of a person's name, nicknames, phone numbers, email addresses). Object matches apply to specific instances of an object while trait type matches, relationship type matches, and relationship trait type matches apply to types. For example, a user can write an object match for "Fred Smith" and a trait type match for "eye color."

Via APIs or GUI components, a user or administrator can at any time create, modify, or remove an object match. The object match configuration includes the text extraction rule, the object type, and an identifier for the object.

Object Trait-Related Extractions

An object trait type match is a rule that defines how different expressions in text can refer to a given object trait type (e.g., eye color). An object trait type match must include reference back to the associated object (e.g., @{PERSON}). An object trait type match allows the match to include a capture group, indicated here by (( )), which returns the value of the trait, for example:

within 1 sentence (@{PERSON} and within 4 words(/ ((blue|green|brown))/ AND /eyes/)

An object trait type match may be one of a set of matches for the same object trait type, if the override values are different for each match. For example, . . . /(grey|gray|GRY)/ could return eye color traits with a common override value of "grey", to make the spelling of the color consistent, while . . . /(blue|blu|BL)/ could return eye color traits with an override value of "blue." Including the object reference in the trait match provides flexibility in how the text implies the association between the object and its trait.

Via APIs or GUI components, a user or administrator can at any time create, modify, or remove an object trait type match, which must include the text extraction rule, the object trait type id, and object type id.

Relationship-Related Extractions

A relationship type match is a rule that defines how different expressions in text can refer to a give relationship type, for example within 5 words(@{PERSON} and /employed by|works for/ @{COMPANY})

A relationship type match must refer back to the two object types associated with the relationship type (e.g., @PERSON and @COMPANY in the previous example). If the relationship type associates two objects of the same type, and the relationship is asymmetric, e.g., a parent-child relationship, the rule must clarify which object is which, as in within 5 words(@{PERSON} and /raised|parent of/ @{RELATED_PERSON})

Via APIs or GUI components, a user or administrator can at any time create, modify, or remove a relationship match. The match configuration must include the text extraction rule, the relationship type ID, and the two object type IDs.

Relationship Trait-Related Extractions

A relationship trait match is a rule that defines how different expressions in text can be mapped back to a given relationship trait type (e.g., start date for an employment relationship). A relationship trait match must include a reference back to the relationship (e.g., @{EMPLOY-MENT}) and allows the match to include a capture group, indicated here by (( )), which returns the value of the trait, as in within 4 words(@{EMPLOYMENT} and /since ((\d\d\d\d))/)

Via APIs or GUI components, a user or administrator can at any time create, modify, or remove a relationship trait match. The match configuration must include the text extraction rule, the relationship trait type ID, the relationship trait data type, and the parent relationship type ID.

2.3 Query Engine Configuration

Rather than being written and applied as needed, the platform stores all queries that users have written and applies them to the OTR store continuously, or "persistently", as that store is updated. This allows queries to serve not only as basic retrieval tools, but as the basis for near real-time notification to users when changes in the world modeled by the OTRs are detected. Queries can also be used to detect when an object newly meets a set of criteria and in response, assign or update a "score" to the object. For example, a number of queries can be written to identify different suspicious features of an insurance claim or parties to a set of claims, allowing a score on that claim or on those parties to be calculated, which reflects the aggregation of those features' scores. By supporting a persistent query processing environment, scores on objects are updated as new data is collected and OTRs are updated. Queries, notifications, and scores are configured as described below.

2.3.1 Query Configuration

In embodiments of the invention, persistent queries can be created, modified, or removed via the appropriate APIs and/or GUI components such as query configuration GUI component 186. A query defines a filter to select objects of a given type from the OTR store. A query includes the object type ID of the objects it is to find and the criterion which must be satisfied for an object to be included in the result. The criterion is a Boolean expression which may include the following elements:

the presence of a given object trait or relationship of a given type
a comparison, e.g., <=>, between values of similar data type derived from
constants
object trait values
counts of relationships of a given type
values of relationship traits of relationships
mathematical calculations of the above 2.3.2 Subscription Configuration Via the appropriate APIs or GUI components, a user or administrator can at any time create, modify, or remove a subscription configuration on a given query. The subscription requests that a specified user receive notification of any new hit on the given query. A subscription configuration must include the query ID and user ID.

2.3.3 Scoring Configuration

Via the appropriate APIs or GUI components, a user or administrator can at any time create, modify, or remove a scoring configuration on a given query. A scoring configuration must include the query ID, the object trait type to be modified, and the amount of change to be applied. When an object hits on a given query, the named object trait type will be incremented (or decremented) by the amount of change.

2.4 GUI Configuration

The platform includes a library of GUI components, an API client designed specifically to interact with the platform API, and a browser-based data store. Most GUI components display or edit one type of resource from the platform, including data (e.g., object, object trait, relationship, relationship trait, document, citation, query hit, and notification) and configuration (e.g., object type, object trait type, relationship type, relationship trait type, object type anchor, object trait type anchor, relationship type anchor, relationship trait type anchor, object match, trait type match, relationship type match, relationship trait type match, query, query subscription, and query scoring rule).

Each resource type may also have corresponding list view GUI components which provide a sequence of single resource views as discussed above, supported by sorting and filtering controls appropriate to the type of resource being displayed. Several specialty views are also supported. One exemplary specialty view is a network graph view which displays a link chart of objects (nodes) connected by relationships (arcs). The view provides controls to extend one or all of the nodes out by another degree of relationship, to show/hide objects and relationships based on their creation date on the platform or the date of report, to show/hide specific objects, and to annotate the graph. Another specialty view is a geographic view which displays objects on a map based on a geographic trait. The view has controls to show/hide objects based the date the geographic trait was recorded on the platform or the date of report, to pan, and to zoom.

GUI components are configured by a software engineer when they are imbedded in a web application. Configuration includes defining any hardcoded parameters required to pull the correct data for the component, pointers to data in the browser data layer or made available by other components, and any appropriate view defaults.

3 Compilation

In embodiments of the present invention, a user or administrator can at any time request that an existing, uncompiled rule library be compiled. The request can be made by the appropriate API or GUI component such as the extraction configuration GUI component 184. The result of the request is the creation of a compiled rule library containing compiled rule books, as described below.

3.1 Rule Libraries

A rule library is a collection of OTR text extraction rules that should be applied as a set to a given block of text during a search. Example rule libraries might be "the 2021-06-05 production set" or "test set 123".

Within a library, text extraction rules are organized into "rule books" such that each book may contain:
  All object matches for objects of the same object type
  All object trait type matches for traits of objects of the same object type
  All relationship type matches for relationships between two objects of the same two types
  All relationship trait type matches for traits of relationships between two objects of the same object type In some cases, the extraction results in one book will depend on the extraction results in another book. For example, to evaluate the following object trait type expression:
  within 1 sentence (@{PERSON} and within 4 words(/((blue|green|brown))/ AND /eyes/)

It is necessary to know where, within the text to be searched for this trait, the extractions from the person object type rule book are. To support this information exchange, when a rule library is compiled, the order in which rule books have to be applied and the chaining of results from one (or zero or two) rules books to another are calculated and stored as part of the compiled rule library.

3.2 Rule Books

As described above, a set of rule books (group of rules) can be identified and chained to produce related, dependent extractions. In the person-company example illustrated in FIG. 3, the library 300 includes a PERSON objects rule book 310, a COMPANY rule book 320, a PERSON traits rule book 330, a COMPANY traits rule book 340, a PERSON-COMPANY relationships rule book 350, and a PERSON-COMPANY relationship traits rule book 360. To evaluate the extracts for this example, the rule books are chained together. Specifically, hits generated by the PERSON objects rule book 310 are fed to the PERSON trait 330 and PERSON-COMPANY relationships rule books 350. The hits generated by the COMPANY rule book 320 are fed to the COMPANY traits 340 and PERSON-COMPANY relationship rule books 350. The hits generated by the PERSON-COMPANY relationships rule book 350 are fed to the PERSON-COMPANY relationship traits rule book 360.

When compiled, a rule book includes multiple components including (1) a pattern tree that encodes patterns in the rules and provides a means to apply them; (2) a predicate set that encodes the Boolean, windowing and ordering expressions and providing a means to evaluate them; and (3) a pattern-to-rule mapping, used during search to determine which predicates to evaluate based on the pattern hits obtained. In an embodiment, each rule book includes these three components.

3.2.1 Pattern Tree

Figure 5A:
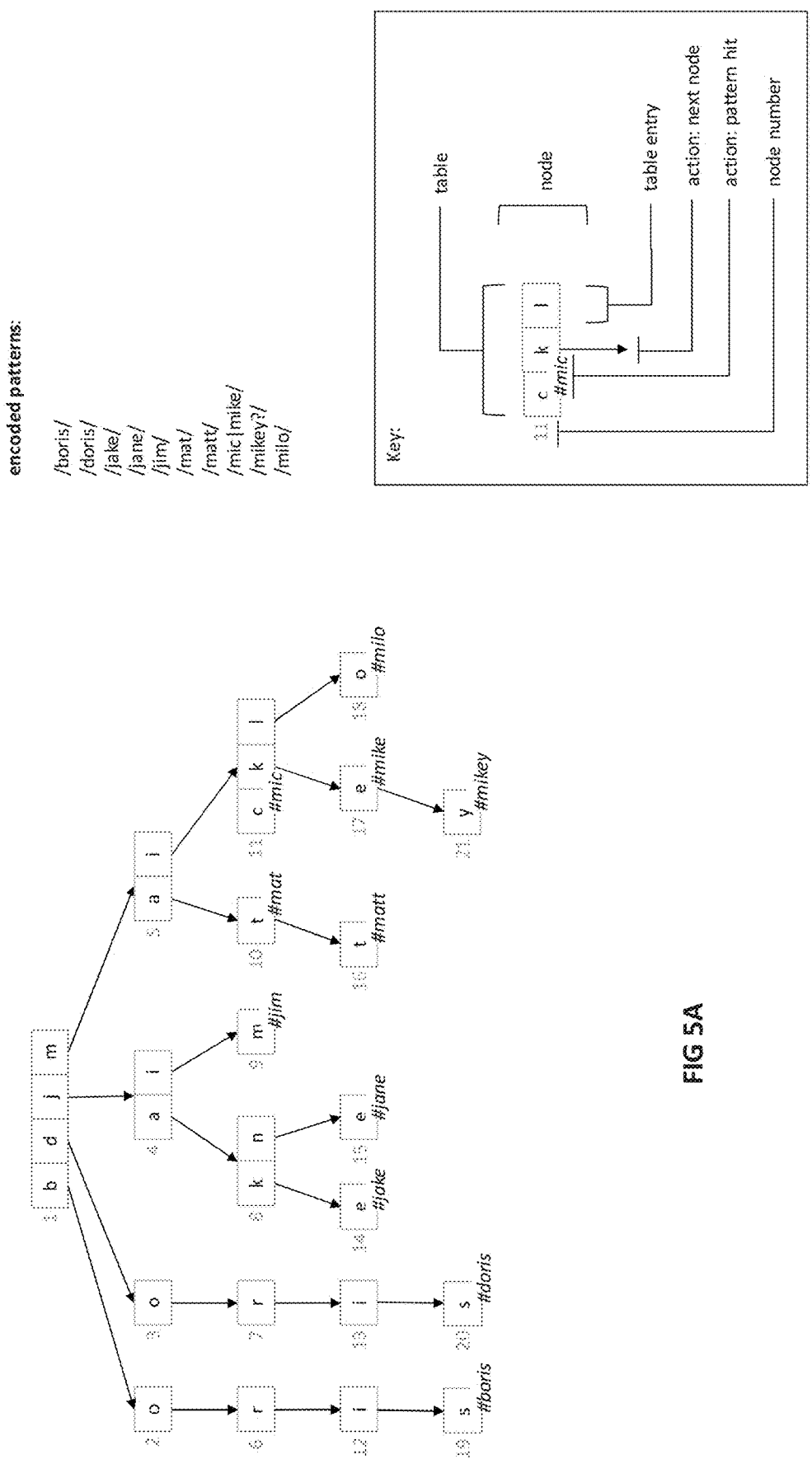
FIG. 5A illustrates an exemplary conceptual pattern tree and FIG. 5B illustrates the conceptual pattern tree with identifiers associated with the patterns.

A pattern tree captures a single tree representation of the combined patterns from all expressions in a rule book. FIG. 5A illustrates an exemplary conceptual pattern tree 500. Conceptually, the pattern tree 500 includes a base node 510 and a series of hierarchical levels 520, each including one or more nodes. In an embodiment, each node in the tree is a table with each entry in the table being a byte, usually a character, which may point to another node. A multibyte character, such as the UTF-8 representation of the Arabic letter "yeh" (bytes 0xD9 0x8A) is simply represented in the tree across two nodes, without possibility of ambiguity.

Following every possible path on a tree generates a list of patterns that the tree can match. If configured patterns overlap, e.g., 'mat' and 'matt' in FIG. 5A, there may be patterns that match at interior nodes in the tree. The exemplary tree in FIG. 5A has 21 nodes matching a total of 10 patterns. Each of the 10 patterns may belong to one or more expression. For example, "mike" could appear in the pattern expression/mike|mic/ and the pattern expression /mikey?/.

Figure 5B:
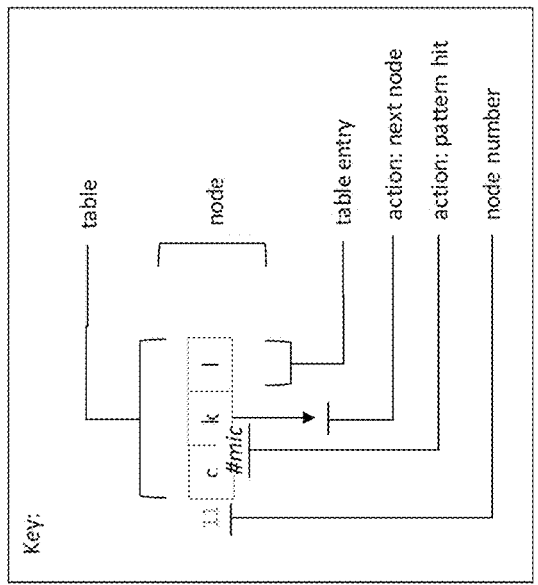
Figure 5B:
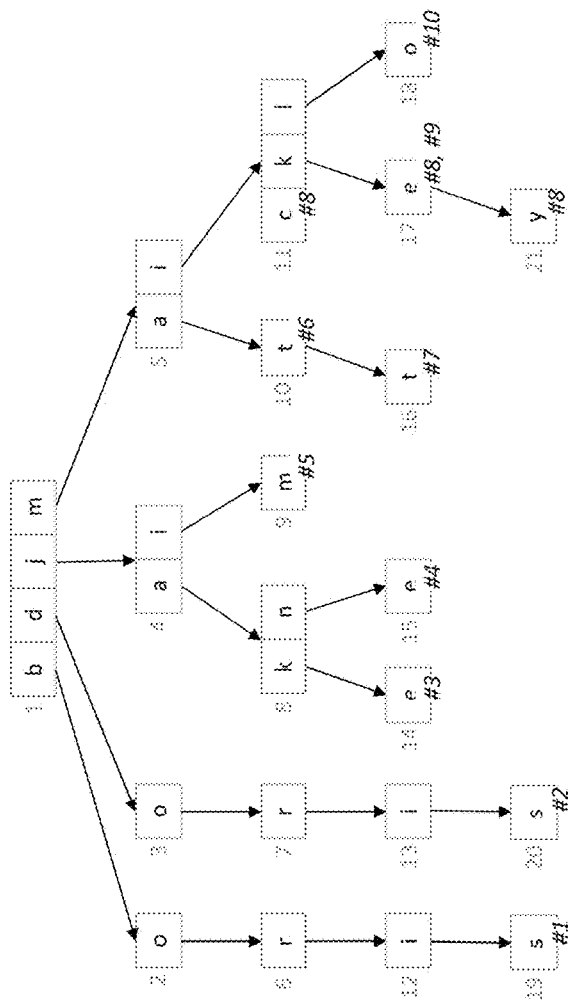

Each pattern is assigned a unique identifier. Any pattern that contains alterations or optional characters or groups can be authored in a variety of ways and achieve the same result. For example, /mi(ch(ae|ea)l|ke/ could also be written /mich(ae|ea)l|mike/ or /michael|micheal|mike/. To separate the pattern tree construction from the pattern authoring preferences of users, patterns containing alternations or optional characters or groups are "unraveled" to generate all possible simple strings that the pattern represents, e.g., michael, micheal, and mike. Each of those unraveled patterns is added to the tree independently, and each is assigned the same pattern ID that the parser assigned to the original pattern. FIG. 5B illustrates the conceptual pattern tree 500B with identifiers associated with the patterns. As shown in FIG. 5B, pattern /mike|mic/ is assigned identifier 8 and pattern /mikey?/ is assigned identifier 9. The name "mike" could appear in both patterns. Therefore, node 17 is associated with identifiers 8 and 9.

Prior implementations of pattern trees are inefficient, particularly for trees that do not support unbounded repeating substrings. A naïve implementation of a pattern tree using a balanced tree and full memory pointers (8 bytes wide on 64-bit operating systems) consumes a great deal of memory because the number of pointers is two times the number of non-terminal characters in search strings. More optimized packing methods exist. However, these methods generally rely on relative addressing to reduce pointer size and frequency, but most make compromises to support insertion as well as retrieval operations, and don't natively incorporate the ability to take actions mid-tree. An implementation of a pattern tree using optimized packing methods for finite state machines (finite automata) introduces unnecessary complexity. These solutions generally focus on high performance in space and time by addressing problems introduced by unbounded repeating substrings. Such methods are inefficient for pattern trees that do not support unbounded repeating substrings.

Embodiments of the present invention employ a packing technique to optimize the pattern tree. In this embodiment, a pattern tree is packed into a set of arrays including a table array, a table entries array, and an actions array. Each entry in the table array is a string of three integers. One integer, table.n, represents the number of entries in the table. Another integer, table.firstEntryIndex, represents the index of the first table entry in the table entries array. The third integer, table.firstActionIndex, represents the index of the first action in the action entries array. The width of the integers can be set based on engineered load for the pattern tree to conserve space.

Each entry in the table entries array is a string of one byte and one integer. The byte, tableEntry.byte, is a byte that may be matched in text. The integer, tableEntry.firstActionOffset, is a pointer to the offset of the first action for this byte within the actions for the table. The width of the integer can be set based on engineered load for the pattern tree to conserve space. The index of the first action of this byte is the tableEntry.firstActionIndex+tableEntry.firstActionOffset. This encoding optimizes the space required for storing points to actions when each character can have any number of actions. The entries for a given table appear sequentially and in order of tableEntry.byte.

Each entry in the action array is a string of one byte and one integer. The byte, referred to as action.flags, is a 7-bit code representing either the go-to-next-table or generate-hit action type and a 1-bit "stop" flag set if this is the last action to execute for this tableEntry byte. The stop flag removes the need to store the number of actions per entry in a node. For example, in FIG. 4B Node 17 has three actions: 2 hits to be recorded and a jump to the next node. If action.flags contains a go-to-next-table, the argument contains the index of the next node in the table array. If action.flags contains a generate-hit, the argument contains the pattern identifier to be recorded. The actions for a given tableEntry appear sequentially. For any given tableEntry there may be zero or more generate-hit actions, followed by zero or one go-to-next-table entry.

Embodiments of the present invention further improve pattern tree efficiency by optimizing the encoding of the base of the pattern tree. The base optimization is premised on a set of observations. First, the majority of search activity occurs in the base table and base-connected tables with the frequency of use dropping as the tree is traversed more deeply. Second, in environments where the majority of text is in any language encodable in ASCII or Latin-1 character sets, the vast majority of characters fall into the ranges A-Z, a-z, 0-9, and '_'. Third, if all patterns are assumed to be case insensitive, that majority character set is reduced to 37 members. Finally, the number of base and base-connected tables is much smaller than the total number of tables in a tree, allowing for an encoding of those two tables that may be less space efficient but more time efficient, without a large impact on the overall space efficiency of the tree.

The pattern tree base optimization technique leverages these observations. In this technique, each tree is implemented as two trees: an ASCII tree, in which the first two characters of all patterns fall in the range a-z|0-9|'_' and a non-ASCII tree which contains all other patterns. The base of the ASCII tree is encoded as a "shortcut" array of 37×37 (1369) integers or null values where each integer is an index into the actions array. This technique replaces one or two binary search operations with a single lookup every time the tree is searched, i.e., once for every starting character position in the text. The width of the integer in the shortcut array may be set based on the engineered load of the pattern tree.

Embodiments of the present invention provide further efficiency by optimizing the ends of the patterns in the pattern tree (referred to herein as the "pattern tree tail"). The pattern tree tail optimization is also based on a set of observations. First, at some point in most patterns in a tree, a point is reached where there is no overlap with other patterns. As a result, the unmatched tail of the pattern is encoded as a series of character tables, each with one entry, with no actions other than go-to-next-table. Second, many of these unmatched tails appear in multiple patterns such as 'tion', ed', etc. Finally, a direct string match of text versus pattern tail, using OS-native string search functions is more efficient than tree traversal.

The pattern tree tail optimization technique leverages these observations by making a set of modifications to the general tree packing technique described above. When adding a pattern to a tree, traverse the existing table with the pattern until reaching a leaf node. The next character in the pattern is added to the current leaf node. The remaining characters in the pattern are called the "pattern tail".

Two new actions for table entries are defined for pattern tree tail optimization: conditional-hit and match-pattern-tail. A new array, patternTails, is then defined as part of the pattern tree. The array, patternTails, is a serialized string array, containing the pattern tails. If the pattern tail is present in the pattern tails already present, the index of its first character in the patternTails array is noted. If the pattern tail is not present, the pattern tail is appended to the patternTails array, noting the index of the first character. Additionally, a conditional-hit with an argument of the current pattern ID, followed by match-pattern-tail, with an argument of the index of the first character of the pattern tail in the patternTails array is added as an action on the leaf node entry.

As noted in the original implementation of pattern tree, the same pattern may appear with different patternIDs, requiring a given table entry to allow multiple record-hit actions. The same is true with pattern tail optimization. A given table entry must allow multiple condition-hit actions before a match-pattern-tail action, if there are multiple hits to be recorded on a successful match of the pattern tail.

Generally, the optimizations above are universal and can be applied as a set to the original implementation. If the original implementation is to be applied to an environment that does not use any of the basic ASCII characters (A-Z, a-z, 0-9, and basic punctuation), as in an example deployment only supporting Arabic, the base optimization technique could be ignored without loss.

3.2.2 Predicate

The predicate set encodes the Booleans included in an expression. An expression can be considered as divided into a predicate and a list of pattern identifier arguments, with the predicate portion being cast as in this example:

within 1 paragraph((within 4 words(ARG1 and ARG2) or ARG3) and not ARG4)

After a new rule is parsed, its three predicates (for match, context, and exclusion processing) and its identifier are stored as part of the rule book and can be retrieved as a set by the rule ID.

An embodiment of the present invention uses a predicate packing technique during compilation to further improve efficiency. In this embodiment, the predicates to be evaluated in a rule book are packed into four arrays: a rules array which is an array of rule structures, a predicates array which is an array of encoded, windowed, ordered, Boolean expressions, a patternIDs array which is an array of pattern identifiers as generated in hits form the pattern tree, and a ruleIDs array which is an array of rule identifiers that can be included in a rule hit.

A rule structure in the rules array is a set of seven integers. The matchPredicateIndex integer is the index of the rule's match predicate within the predicates array. The matchPatternIDsIndex is the index of the match predicate's first argument in the patternIDs array. The contextPredicateIndex is the index of the rule's context predicate within the predicates array, or a NULL value. The contextPatternIDsIndex is the index of the context predicate's first argument in the patternIDs array. The exclusionPredicatandex is the index of the rule's exclusion predicate within the predicates array, or a NULL value. The exclusionPatternIDsIndex is the index of the exclusion predicate's first argument in the patternIDs array. The ruleIDIndex is the index of the ID to be inserted in a rule hit. The integer width of each of these seven integers can be set based on the engineered load of the predicate set.

All predicates are encoded in postfix binary logic as an array of nibbles (half-bytes), representing operations or arguments. The patternIDs associated with a predicate are stored in the same order they are encountered during the evaluation of the predicate, removing a need to encode patternIDs in the predicate itself. A nibble may encode AND (binary operation), OR (binary operation), NOT (unary operation), ARG (argument), WORD-WINDOW or WW(binary operation), SENTENCE-WINDOW or SW (binary operation), or PARAGRAPH-WINDOW or PW(binary operation). The arguments to WINDOW operations are the number of words, sentences or paragraphs in the window, and an AND operation. Windows are encoded AND-OP *W number in this postfix notation. The following example illustrates a predicate:

Expression: within 1 sentence(
/mike/ and
within 6 words(
/jones/ and
(/companyA/ or /companyB/ or (/dog/ and /owner/))))

Pattern IDs assigned: /mike/ -P1, /jones/ -P2, /companyA/ -P3, /companyB/ -P4, /dog/ -P5, /owner/ -P6

Predicate: within 1 sentence(P1 and within 6 words (P2 and (P3 or P4 OR (P5 and P6)))

Predicate Postfix: P5 P6 AND P4 OR P3 OR P2 AND WW 6 P1 and WS 1

Packed Encoding: ARG ARG AND ARG OR ARG OR ARG AND WW 6 ARG AND WS 1, with pattern IDs array P5 P6 P4 P3 P2 P1

3.2.3 Pattern-to-Rule Mapping

The pattern-to-rule mapping step during compilation determines which rules should be evaluated when a set of patterns is matched. The following table illustrates exemplary match expressions in a set of four rules. Based on these expressions, a naïve approach would add A, B, C, D, E, F, G, J, K, M, N, X, Y, and Z to the mapping table.

| Rule 1 | /A/ and /B/ and /C/ |
| Rule 2 | /D/ and (/E/ or (/F/ and /G/) |
| Rule 3 | (/J/ or /K/) and (/M/ or /N/) |
| Rule 4 | /X/ and not (/Y/ and /Z/) |

In embodiments of the present invention, the naïve approach is improved by only including the minimum required set of patterns in the table. For example, considering Rule 1, if pattern A was not hit, the expression evaluates to false regardless of whether B and C were hit. Because A has to be present for the expression to be true, there is no reason to evaluate the expression if A is not present. It is only necessary, then, to include an entry for A in the mapping table; B and C can be ignored. This optimizes the rule book in both space and time: the mapping takes less space, and some unnecessary evaluations are avoided. Note that for Rule 1, any one of A, B, or C could be added to the mapping table with the same result. The approach can therefore further be optimized by analyzing the frequencies of A, B, and C and mapping the least frequent pattern.

In general, a minimum required set of patterns in an expression can be determined using tri-state logic. If an expression evaluates to false when one or more variables (patterns in our case) are set to false and the rest are unknown, the false variables comprise a minimum required set. For example, Rule 1 results in false AND unknown AND unknown=>false. Rule 2 results in /D/ AND (/E/ OR (/F/ AND /G/), false AND (unknown OR (unknown AND unknown)=>false. Because the entire expression is falsified when D is false and all other values are unknown, D is a minimum required set. In Rule 3, no single false variable leads to an evaluation of false: (false OR unknown) AND (unknown OR unknown)=>unknown AND unknown=> unknown. However, setting two variables does lead to an evaluation of false: (false OR false) AND (unknown OR unknown)=>false AND unknown=>false. In this case, [J,K] is a minimum required set. This approach survives NOT operations as well in Rule 4:false AND NOT (unknown AND unknown)=>false AND NOT unknown=>false.

When pattern-to-rule mapping optimization is active, each variable is set to false, one variable at a time with the remainder being set to unknown. The process continues until the expression evaluates to false. If no expression evaluates to false, a pair of variables is set to false with the remaining variables set to unknown. The process on pairs continues until the expression evaluates to false or all pair combinations are exhausted. If no set of pairs force falsification of the expression, all sets of three variables are tried. The overall process continues until a set of the smallest possible number of variables are set to false. Setting all variables to false must result in false. If it does not, as in the example "NOT/missing/", the system rejects the expression as invalid: a match expression that can hit on nothing is not useful and creates untenable volumes of results.

When frequency enhancement is incorporated with the pattern-to-rule mapping optimization, after the first successful evaluation to false, the process continues to identify all possible sets of the same size that satisfy the falsification requirement. Then, the percentage of appearance of the members of each set are identified. The set with the lowest combined percentage is then selected.

4 Processing

Processing mode includes two phases: the collection phase and extraction phase. Processing is a persistent, near real-time mode intended to update OTRs, citations, query hits, notifications and scores as new data is collected.

4.1 Collection

Figure 6:
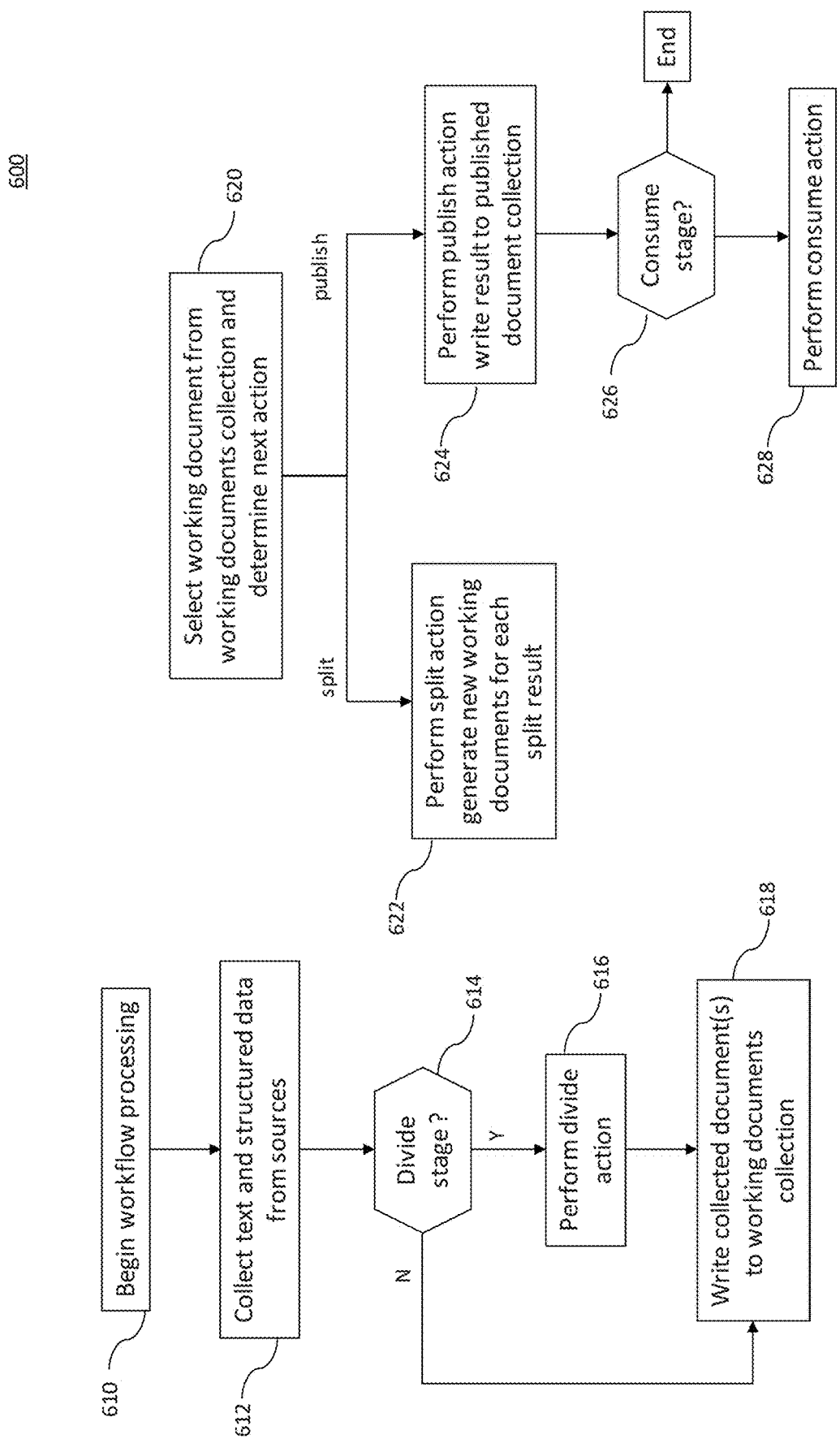
FIG. 6 illustrates a flowchart of exemplary steps during the collection phase of the processing mode, according to embodiments of the present invention.

FIG. 6 illustrates a flowchart 600 of exemplary steps during the collection phase of the processing mode, according to embodiments of the present invention. The collect phase of processing begins in step 610 when ETL module begins processing a workflow. In step 612, ETL module enters the collect stage of the workflow which persistently collects text and structured data from configured sources. In an embodiment, text and structured data may be collected on a pre-defined schedule and/or on demand.

For example, a scheduler in the ETL module runs at pre-defined intervals (e.g., once a second) to identify which scheduled collect actions should be kicked off, based on their configurations. For those actions, the scheduler produces a working trigger document that serves to trigger the collection stage. The ETL module includes a set of agents. Every agent can see all working documents and claims one to process. Therefore, an agent will pick up a trigger document and run the configured collect action identified in the trigger.

In step 614, the agent makes a determination as to whether a divide stage is defined for the workflow being processed. If a divide stage is defined for the workflow, the agent performs the divide actions in step 616 after the collect stage but before the document is written to the working documents collection within the documents store, to ensure the new working document is not too large for the system.

In step 618, each collected (and possibly divided) document is written to the working documents collection. The working documents are tagged with information to identify the next action(s) from the workflow to be carried out. Steps 614-618 are repeated for each document collected for the workflow.

In step 620, an agent picks up a working document from the working documents collection and, if the next action tagged in the document is a split action, performs the split action in step 622 to generate a new working document for each split result. Operation then proceeds to step 624.

In step 624, if the document indicates that the document is ready for publication, the agent applies the publish action and writes the result to the appropriate published document collection. The publish action may include searching existing published documents, in case the working document is a revision or replacement, and may merge the two, overwrite the existing, or abandon the new document.

In step 626, after the publication stage is completed, a determination is made whether consume actions are defined for the workflow. If consume actions are defined, the agent carries out any identified consume actions in step 628. By default, each workflow includes a consume action that forwards the published document to the extraction engine.

In an embodiment, a working document can be written to the document collection without being advanced to the next stage. This allows a document to sit in, for example, the collection stage and have multiple agents pick it up over time to add new collected documents to it. This option serves as a way to merge different collected documents into one published document.

Errors that occur before publication are recorded within the faulty documents and the faulty documents are stored in a failures collection within the documents store for administrator action. Errors in consume actions on published documents are recorded in the published document, which is stored in the documents store, and flagged for administrator action.

4.2 Extraction

Figure 7:
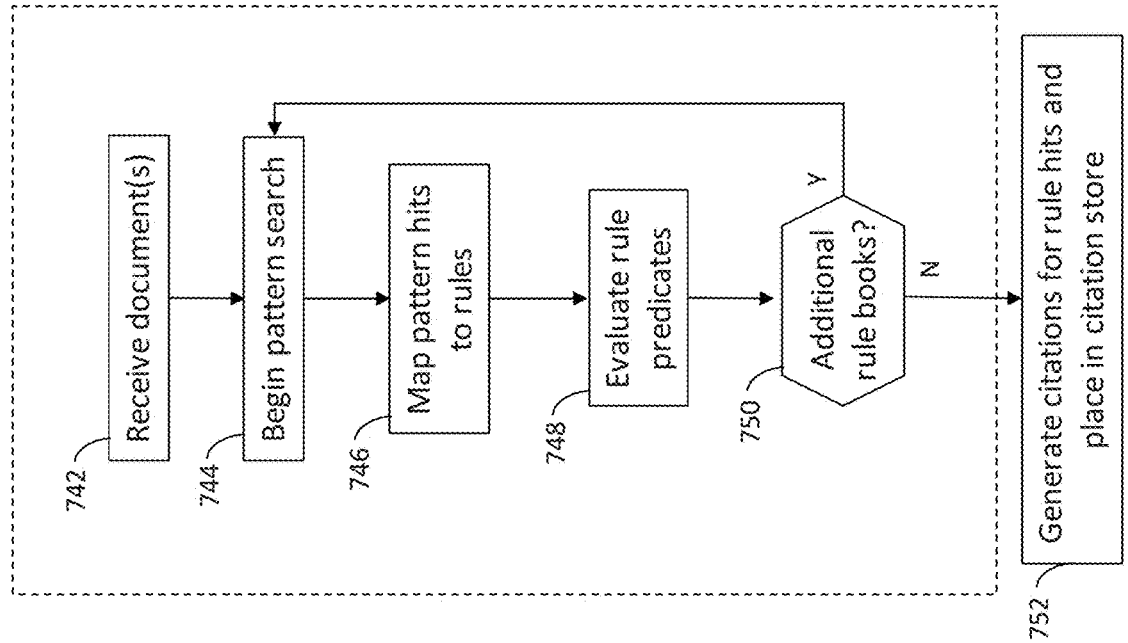
FIG. 7 illustrates a flowchart of exemplary steps during the extraction phase of the processing mode, according to embodiments of the present invention.
Figure 7:
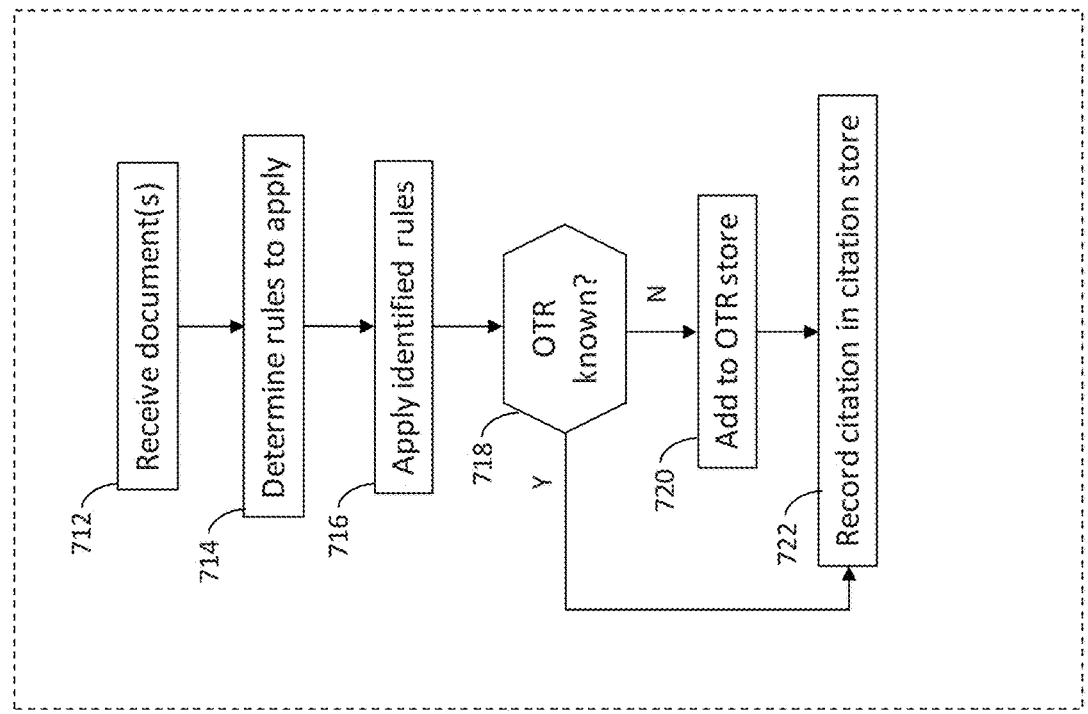

FIG. 7 illustrates a flowchart 700 of exemplary steps during the extraction phase of the processing mode, according to embodiments of the present invention. During the extraction phase, extraction engine 120 applies configured extraction rules to the stream of text received from the ETL via a consume action. Extraction rules are applied in two contexts: after configuration changes (production environment) and after receipt of new documents.

Extraction configurations change when users create new extraction rules, make revisions to them, or delete them. At configured intervals (e.g., between 15 minutes and 4 hours) the platform collects the current rules in the extraction rules store, creates a new library in the text extractions engine, adds rules to the library, and compiles the library. This library becomes the current "production library" against which searches are made. OTRs generated in the past, against documents that are now in the document store, may now be invalid if the extraction rules for them changed. To keep the OTRs database consistent with the new rules, all documents in the document store must be rerun against the new rules and OTRs and citations must be updated.

Not all documents in the document store may have equal analytic value. The document's age or other factors, e.g., whether an insurance claim is open or closed, can affect its value. The re-extraction of old documents is done in order of document priority based on the determined value of the document. The rules for setting a document's value are referred to as "aging rules." Each document type in the document store can have its own aging rules. This process runs in the background and in environments with less hardware support, is not guaranteed to complete before the next re-run. This approach ensures that the newest, highest priority documents are extracted first.

During new document processing, as ETL module 110 ingests new documents, it sends each one to extraction engine 120. This is configured as a universal standard analytics consume action in the ETL workflow. Multiple actions can be configured, allowing new documents to be routed to different extraction engines supporting different customers.

If the given document is a revision of a previous document, the citations for the previous version are flagged for potential deletion ("soft delete"). Two types of extractions are performed: field extractions (steps 712-722) and text extractions (steps 740-750). In either case, the process must determine which facts to extract from which fields based on the configured anchors that apply to that document type.

In the case of field extractions, the entire value in the field is extracted. If extracting an object trait or relationship trait, the process verifies that it can be converted to the expected data type. If the extracted OTR is not yet in the OTR Store, it is added. Whether the OTR was pre-existing or just created, a new citation is created to link the OTR back to this field in this document. In the case of text extractions, each anchored text block is submitted to the text extraction component of the extraction engine for search against the previously compiled extraction configurations. Each search request to the text extraction component includes the text itself, metadata to be echoed back in any resulting match results ("citations"), and optional parameters to limit the scope of the search. These optional parameters may: limit the search to a list of object types, implying that only those object types and the traits and relationships they support should be extracted; an "object only" scope option, in which traits and relationships are not extracted; and a "naked traits and relationships" scope option, in which traits and relationships that do not appear within the range of a parent object are still reported as a hit. The naked scope option supports the discovery of as-of-yet unextracted objects by their proximity to known trait type and relationship type extractions. The text extraction component returns a list of OTR citations for the block.

Extraction engine 120 organizes the results of extraction rule hits into objects, traits, relationships, and relationship traits ("OTRs") (e.g., "Alice", "blue eyes", "employed by Acme", "for 5 years", respectively) of user-defined OTR types (e.g., "person", "eye color", "employer", "duration", respectively). This step effectively translates information in narrative text into a standard relational representation of those types of facts of interest to the user base, as expressed through the extraction rules those users write.

Citations are applied to the fact store, creating facts as necessary and either creating new citations, or in the case of soft-deletes, reversing the soft-deletes. Any soft-deletes that are not reversed are made permanent. If after deletion, no citations exist for a given OTR, the fact is deleted from the OTR store.

4.2.1 Field Extraction

The field extraction phase 710 begins in step 712 when extraction engine 120 receives one or more documents for extraction. The documents may be received from document store 130 or from ETL module 110.

The field extraction engine determines which field extractions rules should be applied to a given document in step 712 based on the document's type and the anchors defined as part of the field extraction rules. In step 714, extraction engine 120 applies the identified rules. For each OTR extracted from the document, in step 716, the field extraction engine examines the OTR store to determine if this OTR is already known and if not, adds it to the OTR store in step 718. An OTR is "known" if:

- The OTR is an object and an object of this object type and identity exists in the OTR store
- The OTR is an object trait or a relationship trait, and a trait of this type and value exists in the OTR store for the given object or relationship
- The OTR is a relationship and a relationship of this type exists between the two given objects Whether the OTR was known, the field extraction engine also records a citation in the citation store in step 720, linking the OTR to the document in which it was found.

In step 722, the extraction engine determines whether additional OTRs remain to be processed. If additional OTRs remain, the process returns to step 716 for the next OTR.

4.2.2 Text Extraction

The text extraction phase 740 begins in step 742 when the extraction engine 120 receives one or more documents for extraction. The documents may be received from document store 130 or from ETL module 110.

Extraction engine 120 then invokes a search for each pair of text block and library and searches the text in the documents against the rules in the compiled configuration. For each pair, the search is carried out on a rule book-by-rule book basis in the order defined by rule book chaining. In the exemplary embodiment described below, space and time efficiencies in processing are achieved by turning the search paradigm ninety degrees. In traditional systems, the index of the source documents is compiled into an efficient data structure, and search terms walk that data structure. In the exemplary approach described herein, the extraction rules are compiled into an efficient data structure, and source documents walk that structure. This way, model processing scales with the number of extraction rules, not the volume of source data, making engineering and growth planning more predictable.

The pattern tree search process begins with step 744 in which the pattern tree is applied to the text for a rule book. The task of feeding text to the pattern tree falls to a text iterator in extraction engine 120. In embodiments of the invention, the text iterator sets an initial base pointer and scan pointer at the beginning of the text block. The table in the appropriate base node is then searched for the character pointed to by the scan pointer. If one of the table entries includes the character pointed to by the scan pointer, the tree is traversed to the next table and the text iterator's scan pointer is advanced by one byte. As the tree is traversed, any hit actions encountered will cause a pattern hit record to be generated.

When the scan pointer can proceed no further in the pattern tree, the base pointer is advanced one byte and the scan pointer is reset to equal the base pointer. Pattern tree search ends when the base pointer reaches the second-from-last character (as patterns must be at least three characters long). The complete pattern hit list is then passed to the pattern-to-rule mapping step.

If pattern tree base optimization is turned on, as the text iterator updates the base and scan points, the text iterator translates the characters pointed to via table lookup to a space for spaces and non-printable characters and to lower-case alphabetic characters for upper- and lower-case alphabetic characters, digits, or punctuation. In the translation, the codepoints returned for lowercase alphabetic characters, digits, and '_' will be in the range 0-36. When the base pointer is set to a new position, if the pointed-to and following character in text both map to 0-36, a key will be calculated as 37*first-encoded-value+second-encoded-value and a lookup will be performed against the shortcut table at the base of the tree. If there is a non-NULL value in the shortcut table, the scan pointer is advanced by one and the actions pointed to by the shortcut table entry are executed. The process then continues as described above from the pattern search step.

If pattern tail optimization is turned on, and the actions currently pointed to in the pattern tree are condition-hit(s) followed by a pattern tail match, the process uses basic string comparison to match the string of text currently pointed to by the text iterator against the indicated tail. If there is a match, the conditional hits are recognized as valid hits. Otherwise, processing from this text iterator base pointer ends, the base pointer is advanced one byte, and the process returns to the point at which the table in the appropriate base node is searched for the character pointed to by the new base point and scan pointer.

Embodiments of the present invention incorporate an accent insensitivity feature to pattern matching. The feature can be activated by a user. When active, the feature allows for efficient and automatic matching of patterns, regardless of the appearance of diacritical marks in the text.

Text sources are generally inconsistent in the use of diacritical marks. The occurs in English with words "loaned" from other languages such as résumé, in foreign words and names, and in Arabic texts where vowel marks are dropped. Users authoring patterns are not always aware of these variants or judge them as irrelevant when creating a pattern. If the text makes a different assumption than the user and is more explicit when including diacritical marks, the string of bytes in the pattern will not match the string of bytes in the text and the expected match will not be generated. It is therefore necessary for the parser to ignore diacritical marks when creating patterns, and for the text iterator to suppress diacritical marks in text when searching.

When accent insensitivity is incorporated into the pattern search, the text iterator assumes that all text blocks are to be Unicode (UTF-8) encoded and have been normalized through canonical decomposition. This approach ensures that diacritical marks appear as separate byte codes after the character they modify. The text iterator further ignores diacritical mark encodings when passing characters to the search algorithm. Additional, because text is recomposed before presentation to the user, the hit range reported by the text iterator treats diacritical mark encodings as zero-byte width.

Returning to FIG. 7, in step 746, pattern hits are mapped to rules. For example, pattern-to-rule mapping identifies the list of rules whose predicates must be evaluated based on the pattern hits. In an embodiment, the system retrieves the rule associated with each identified pattern.

In step 748, the predicates for the rules are evaluated. For each mapped rule, the Boolean match expression is evaluated, replacing pattern IDs which have hits with true and those which don't with false, and replacing parent IDs (e.g., @{PERSON}) with true if at least one parent hit is passed. If the search is using a naked scope, parent IDs are instead replaced with true at all times, whether or not a parent hit exists. If a context expression is present in the rule, it is also evaluated and must evaluate to true for the rule to be true. If an exclusion expression is present, it is also evaluated and must evaluate to false for the rule to be true.

For every rule that evaluates to true, a rule hit is generated and added to the hit store. If the rule hit includes reference to one or more prior hits through chaining, a unique rule hit is generated for every parent present in rule hits passed into the rule book.

In step 750, a determination is made whether additional rule books exist in the library to be considered. If additional rule books remain, the process returns to step 744 for the next rule book. If no additional rule books remain, the text extraction engine generates citations for all the rule hits found and places them in the citation store in step 752. For each citation that refers to an OTR that does not yet exist, the OTR is created and added to the OTR store. Processing of this piece of incoming data terminates here.

4.2.3 Additional Techniques

A number of additional techniques in the definition, compilation, and application of extraction rules can improve the overall efficiency of search in certain conditions, and improve the accuracy of extraction, as described below.

4.2.3.1 Boundary Detection

Embodiments of the present invention extend the functionality of pattern matching using a boundary detection technique. Regular expressions support an option within a pattern to match a boundary between word and non-word characters. Word characters include the set [a-zA-Z0-9_]. This optional technique is useful for distinguishing substrings at the beginning or end of a word versus substrings embedded in the middle of the word. For example, a user desired to match the pattern "state" in "statement" or "stated" but not "intestate".

When boundary detection is active, users can include a code for a boundary (e.g., "\b") in any pattern in an expression, which the parser will include directly in parsed patterns. When boundary detection is enabled, the number of root tables doubles to four: (1) shortcuts on a leading boundary, (2) non-shortcut characters on a leading boundary, (3) shortcuts not on a leading boundary, (4) non-shortcut characters not on a leading boundary. Patterns with a boundary code as the first character in the pattern have the boundary character stripped and are rooted in the appropriate leading boundary root table. Patterns with uncoded boundaries, e.g., /mike jones/, are groomed to include boundary codes between word and non-word characters, e.g., /mike\b\bjones/. Boundary codes in the middle or at the end of a pattern are encoded directly as character points in the pattern tree, using one of the non-printable ASCII code points.

Step 744 of the pattern extraction phase is modified to incorporate the boundary detection technique. In this embodiment, when the text iterator base pointer is on a boundary, the text iterator reports the current base content as well as a flag indicating that it is on a boundary. When in this condition, when the base pointer is incremented, the base pointer remains at its current location and changes the boundary flag to false. This allows patterns not specified to match on a boundary, i.e., to match anywhere, to match on a boundary. Additionally, in this embodiment, when the text iterator's scan pointer encounters a boundary between a word and non-word character, the scan pointer reports the current character as a boundary code, allowing a match of patterns that specify boundary codes in this position. When in this condition and then incremented, the scan pointer moves forward to the next character.

4.2.3.2 Word-Character and Digit Wildcard Support

Embodiments of the present invention enhance pattern matching through word-character and digit wildcard support. It is frequently useful to allow a pattern to match any word character or more specifically, any digit. For example, the code '\d' can be used to mean 'any digit 0-9' and the code '\w' can be used to mean 'any word character.' The wildcards could be used, for example, in social security number patterns /\d\d\d-\d\d-\d\d\d\d/, or searches for a partial license plate /\w\w-303, among other uses.

Figure 8:
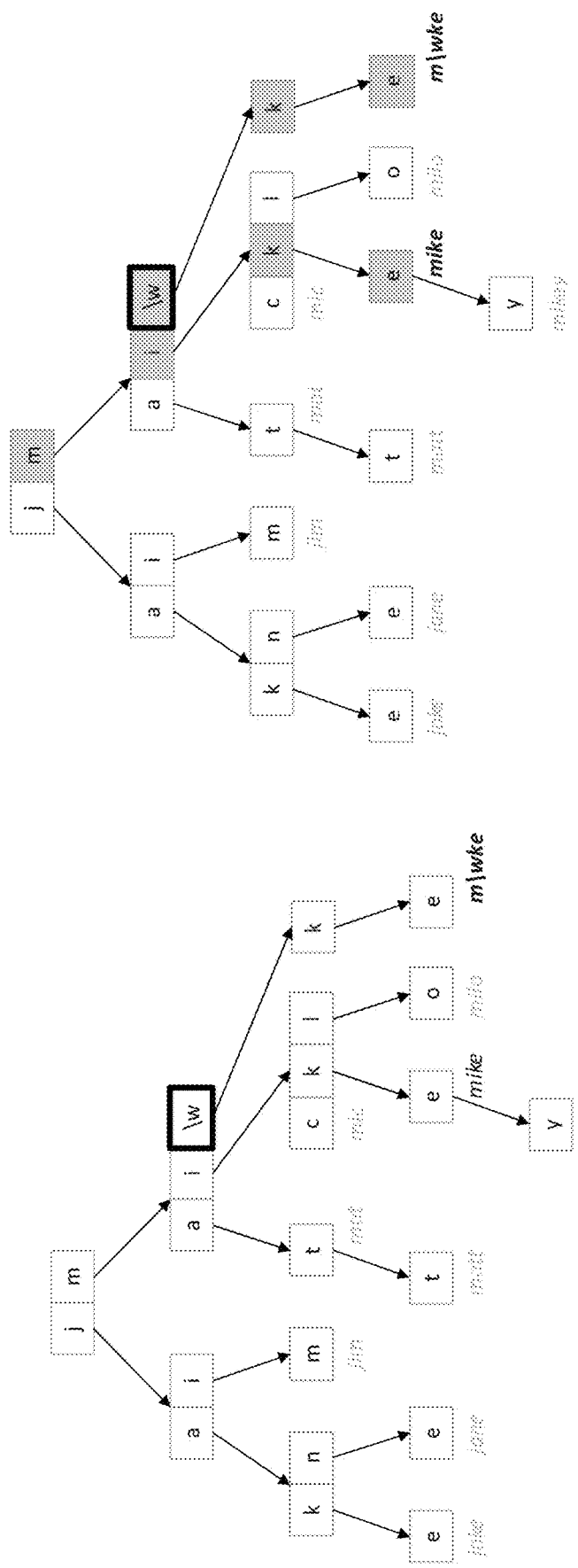
FIG. 8 illustrates an exemplary pattern tree for wildcard support.

When word-character and digit wildcard support is active, a pattern can contain codes for a wildcard digit (e.g., '\d') or a wildcard word character (e.g., '\w'). An exemplary pattern tree for wildcard support is illustrated in FIG. 8. During compilation, patterns containing wildcard characters in either of the first two positions will not be considered eligible for shortcutting. Character tables are expanded to include a dedicated entry for \d and one for \w. As patterns are added to pattern trees, any appearance of \d or \w in the pattern traverses the node through the dedicated entry for \d and/or \w.

Through this wildcard technique, any piece of text may not be successfully matched by multiple paths through a pattern tree. For example, in the tree depicted in FIG. Z2-B, the text "mike" could match both /mike/ and /m\wke/ patterns which appear in different traversal paths in the tree.

Because more than one match can occur in a given node in the wildcard technique, step 744 of the pattern extraction phase is modified. In this embodiment, for each of the table entries (including dedicated \w and \d entries) matching the character pointed to by the scan pointer, the rest of the tree is traversed. From the current node, the tree is traversed to the next table and the scan pointer is advanced by one byte.

4.2.3.3 Auto-Squeeze

White space exists between two words in a pattern. The length and nature of that whitespace can cause problems if the patterns have to be written to account for every length and type of white space that can appear between two words.

To address this issue, embodiments of the present invention are modified to treat all white space the same character and squeeze white space in patterns (i.e., reduce to a single space character during parsing). In addition, the text iterator reports only the first white space character that it encounters in a string of white space characters.

When auto-squeeze is activated, in parsing step 320, strings of one or more white space characters in patterns are reduced to a single space character. And, in extraction step 744, every non-printable and white space character are mapped to a space character by the text iterator and only the first mapped space character in a string of space characters is presented by the text iterator.

4.2.3.4 Optimization of Windowed Searches Involving Parent Hits

Figure 9:
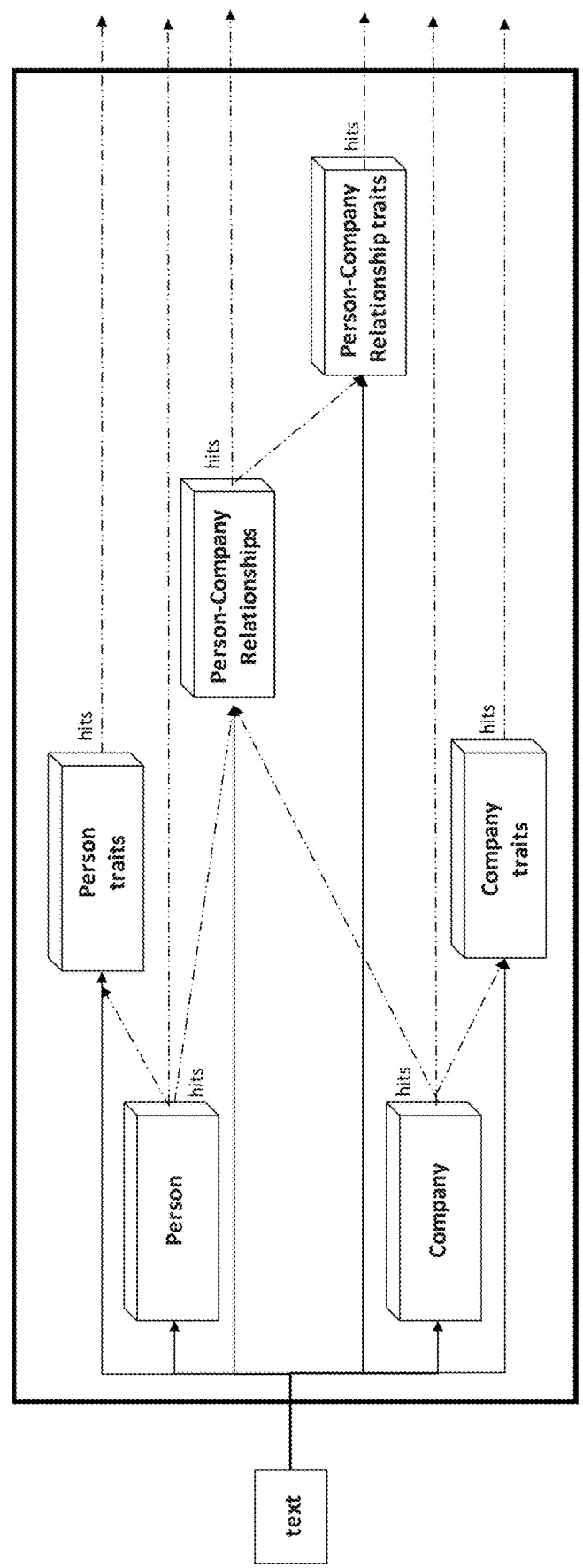
FIG. 9 illustrates an exemplary chain of rule books.

As discussed above, rule books can be chained such that hits from one rule book can be fed into another rule book. FIG. 9 illustrates an exemplary chain of rule books. In this example, a rule book generates hits on persons and feeds those "person hits" into a rule book that generates hits on people traits. Consider the following example:

PERSON hits: Mike Jones, Steve Urkel, Velma Dinkley, Marty McFly

PERSON trait rule: within 1 sentence(@{PERSON} and not /(cartoon|movie|tv) character/)

As highlighted by the above example, the vast majority of trait and relationship rules will have, at their outermost levels, a WITHIN operator to force the association of the trait or relationship to the correct objects. Before scanning the text, the locations of each of the PERSON hits coming into the rule book are known. Therefore, the scanning of the document can be limited to the text within the window range of each expression. In the above example, only the sentences in which we see hits on people need to be scanned. This significantly reduces the amount of time spent searching text for these traits and relationships. However, it may not be efficient to break all of the expressions in a rule book into groups based on its outermost window range, e.g., 1 sentence vs 2 sentences vs 3 sentences vs 5 words, because that would splinter our pattern tree into multiple pattern trees—$O(n \log n)$ goes to $kO(m \log m)$ $m \ll n$.

When windowed search optimization is active, a set of modifications is made during compilation step 360. First, each rule book of order 1 or greater supports three separate pattern trees: document range, paragraph range, and sentence range. Second, expressions with no outer WITHIN restriction or with a WITHIN of greater than 1 paragraph are added to the document range tree. Third, expressions with an outer WITHIN of 1 paragraph, or of 2 or more sentences, are added to the paragraph range tree. And, fourth, expressions with an outer WITHIN of 1 sentence or smaller are added to the sentence range tree.

A set of modifications to text extraction step 744 is made. In rule books of order 1 or greater, the text iterator feeds only the sentences with sufficient parent hits to the sentence pattern tree, if the sentence pattern tree is not empty. The text iterator then feeds only the paragraphs with sufficient parent hits to the paragraph tree, if the paragraph tree is not empty. Finally, the text iterator feeds the full document to the document tree, if the document tree is not empty.

4.2.3.5 Co-Referencing

A co-referent is a secondary reference in text to something that was previously referred to by a different string. For example, "United States President Pat Smith" may later be referred to as "President Smith", "Smith", "she" or "her". Identifying co-referents in a text can improve the extraction of OTRs by correctly extracting objects, even when the reference used in text does not exactly hit the match expression of a text extraction rule. A number of techniques, including machine learning pipelines, exist that will produce a set of co-references in a text.

When co-referencing is activated, a modification to the text extraction process (steps 744 through 750) is made. After object extraction but before trait or relationship extraction (prior to step 750), the text extraction engine applies co-referencing to the text and correlates the hits from object extraction to the co-references reported. Additional citations are generated for the co-references and added to this list of hits for the appropriate object type before the list is forwarded to other rule books. Co-referencing results may be stored with the document for later re-use, saving the text extraction engine from evaluating co-references on every search of the document.

4.2.3.6 Grammatical Analysis

Under normal processing of text extraction rules, the association of a trait or relationship to one or two objects is based on lexical distance and, optionally, ordering. Grammatical analysis of text, i.e., identifying the parts of speech in the text and the associations between them, allow traits and relationships to be based on more than lexical distance and ordering.

When grammatical analysis is activated, the text extraction engine evaluates parts of speech within the text and augments lexical-distance-based association rules with exposed grammatical relationships. If, for example, an object trait rule of "within 5 words(@{PERSON} and /blue eyes/)" were applied to the text "Frank Sinatra, renowned for his seemingly endless singing career and blue eyes . . . ", the within test would fail, even if co-referencing tagged "his". With the application of grammatical analysis, "blue eyes" is exposed as a trait of Frank Sinatra, and extraction is more accurate.

4.3 Query Evaluation

Changes to the content of the OTR store will trigger query evaluation. The types of OTRs that have been added, changed, or removed are mapped to the queries whose results are dependent on those OTR types. The mapped queries are applied to the OTRs that have been changed and hits for query-object pairs are updated based on the new query results.

If scoring is configured for any query with new results, that score configuration will include a numerical score value and the object trait type to be modified by that value. For each object that is now discovered to hit on the query, that trait for that object is incremented (or decremented, for negative score values) by that value. For each object that is now discovered to no longer hit on the query, that trait for that object is decremented (or incremented, for negative score values) by that value. If there are notification subscriptions configured for queries with new hits, the platform records a query notification for each subscribed user.

5 Access

As the platform's processing mode continuously collects data and updates OTRs, citations, and query hits, users and external systems may, in parallel, access that data. Via APIs or GUIs, a human user or administrator, or an external system, can at any time access data and configuration information on the platform.

5.1 API

External systems can access data and functions on the platform via an API. The API includes access to all data and configuration resources, as previously listed in Section 2.6. Each resource is supported by one or more GET, POST, PUT, and DELETE operations. Access to specific operations for specific resources can be enabled or denied on a user-by-user basis.

Access to the resources listed as "data" in Section 2.6 may also be restricted on a user-by-user basis, by controlling the object types and document types a given user has access to. To access a citation, the user must have rights to the object type (or parent object type(s), for traits and relationships) and to the document type. To access the OTRs themselves, the user must have access to at least one of the citations which support them.

5.2 GUI Components

Users can access data and functions on the platform via GUI components that interact with the platform. GUI components can load data from the platform, from a data cache in the browser, or from other components; display data in ways appropriate to the data type; allow the user to modify the display or request information from the platform; or publish data to the data layer or to other components (to reflect, for example, which data item in a list of data items the user has selected).

A GUI component may be triggered to load data by four different, independent types of events. First, the user loads a web page containing a component and that component is pre-configured by the web page code to request specific data. Second, the user activates a control, specific to the type of GUI component, which launches a request for data. Third, another component on the page publishes data which the GUI component has pre-configured to monitor. Finally, data is updated in the data cache which the GUI component is pre-configured to monitor.

6. Computer Devices

In some embodiments, some or all of the processing described above can be carried out on a personal computing device or on one or more centralized computing devices. In embodiments, some or all of the data described above can be stored on a personal computing device, in data storage hosted on one or more centralized computing devices, or via cloud-based storage.

Figure 10:
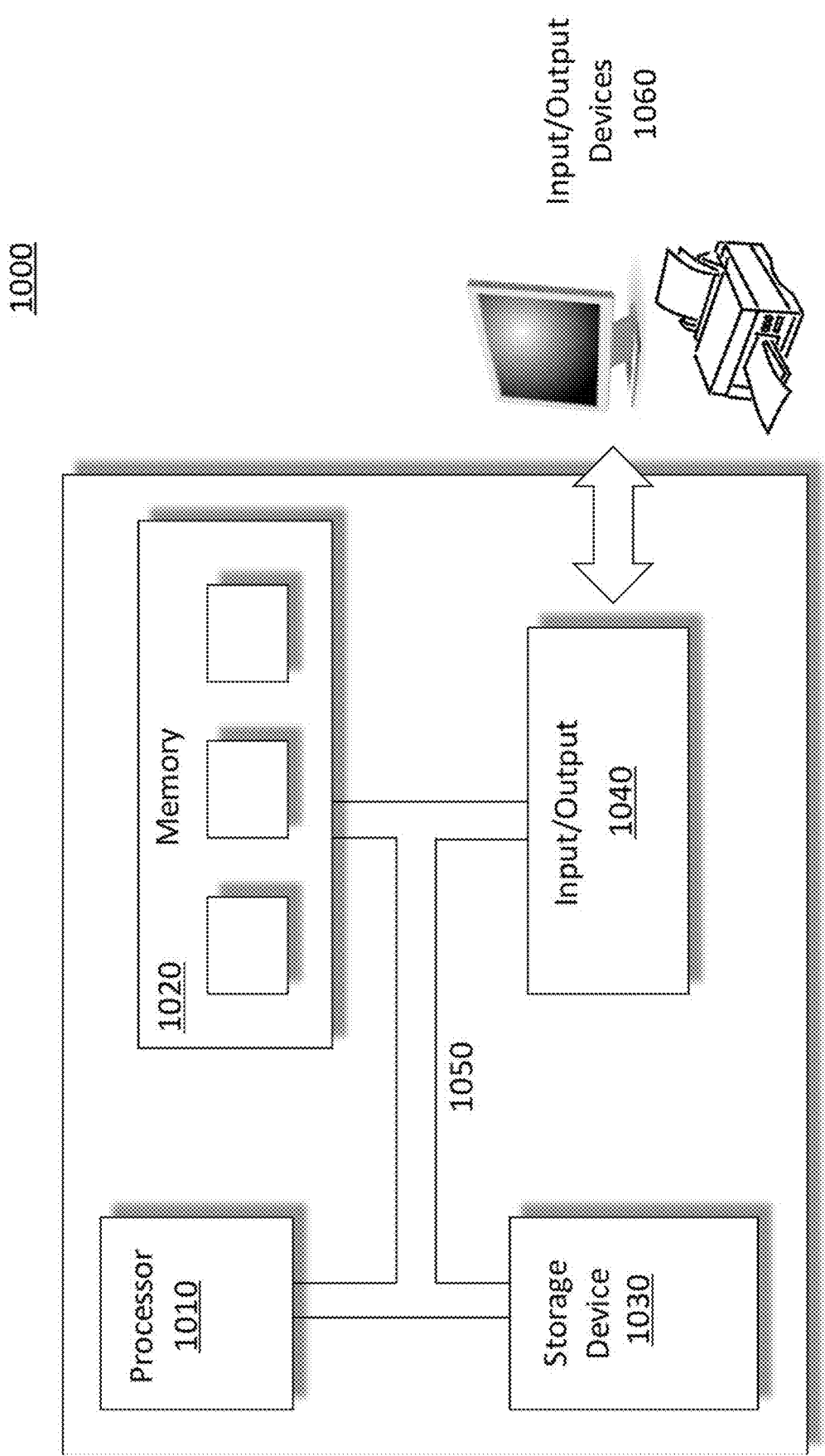
FIG. 10 is a block diagram showing some of the components typically incorporated in at least some of the computer systems and other devices on which the disclosed system operates in accordance with some implementations of the present technology.

FIG. 10 is a block diagram of an example computer system 1000 that may be used in implementing the systems and methods described herein. General-purpose computers, network appliances, mobile devices, or other electronic systems may also include at least portions of the system 1000. The system 1000 includes processor 1010, memory 1020, storage device 1030, and input/output device 1040. Each of the components 1010, 1020, 1030, and 1040 may be interconnected, for example, using a system bus 1050.

Processor 1010 is capable of processing instructions for execution within the system 1000. Processor 1010 is capable of processing instructions stored in the memory 1020 or on the storage device 1030. In some implementations, the memory 1020 is a non-transitory computer-readable medium. In some implementations, the memory 1020 is a volatile memory unit. In some implementations, the memory 1020 is a non-volatile memory unit.

Storage device 1030 is capable of providing mass storage for system 1000. In some implementations, storage device 1030 is a non-transitory computer-readable medium. In various different implementations, the storage device 1030 may include, for example, a hard disk device, an optical disk device, a solid-state drive, a flash drive, or some other large capacity storage device. For example, the storage device may store long-term data (e.g., database data, file system data, etc.). The input/output device 1040 provides input/output operations for the system 700. In some implementations, input/output device 1040 may include one or more network interface devices, e.g., an Ethernet card, a serial communication device, e.g., an RS-232 port, and/or a wireless interface device, e.g., an 802.11 card, or a 4G wireless modem. In some implementations, the input/output device may include driver devices configured to receive input data and send output data to other input/output devices, e.g., keyboard, printer and display devices 1060.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium.

Although an example processing system has been described in FIG. 10, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program medium for execution by, or to control the operation of, data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA or an ASIC.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A computer-implemented method for extracting text from a set of documents, the method comprising:
   receiving a document for extraction;
   identifying a rule book to apply during extraction, wherein the rule book includes one or more text extraction rules, wherein each of the text extraction rules includes at least one match expression, and wherein the at least one match expression includes at least one pattern;
   searching a pattern tree on a first set of text in the document to determine whether a pattern hit exists, wherein the pattern tree represents the at least one pattern included in the at least one match expression in each text extraction rule in the identified rule book, and wherein a hit indicates a match between the document text and a pattern in the pattern tree;
   repeating the searching step for one or more subsequent sets of text in the document, wherein each set of text is different;
   mapping each identified pattern hit to a rule in the one or more text extraction rules in the rule book to generate a set of mapped rules;
   for each mapped rule, evaluating one or more predicates included in the mapped rule to determine whether a rule hit exists;
   generating a citation for each identified rule hit;
   determining whether additional rule books remain to apply during extraction;
   if additional rule books remain to apply, identifying a next rule book and repeating the searching, first repeating, mapping, evaluating, generating, and determining steps; and
   if no additional rule books remain to apply, storing the generated citations in a citation database.

2. The method of claim 1, wherein the pattern tree including a base node and one or more hierarchical levels, wherein each hierarchical level includes one or more nodes, wherein the base node and each node in the one or more hierarchical levels includes a table, and wherein a path on the pattern tree traversing the base node and a set of nodes on one or more hierarchical levels represents a pattern in the at least one patterns in the rule book.

3. The method of claim 2, further comprising:
optimizing the pattern tree by packing the pattern tree into a plurality of arrays, wherein the plurality of arrays includes a table array, a table entries array, and an actions array,
wherein an entry in the table array includes an indication of the number of entries in the array, an index of a table entry in the table entries array, and an index of an action in the actions array,
wherein an entry in the table entry array includes a representation of text that may be matched and an indication of an offset to apply to entries in the actions array; and
wherein an entry in the actions array includes an indication of an action type to execute and a stop flag.

4. The method of claim 2, further comprising:
generating a first pattern tree, wherein the first pattern tree is an ASCI tree and wherein the first two characters of each pattern in the one or more patterns that fall in the range of a-z, 0-9, and _, and are packed as a unit; and
generating a second pattern tree, wherein the second pattern tree is a non-ASCII tree includes any pattern not included in the first pattern tree.

5. The method of claim 1, wherein the text extraction rule further comprises a context expression to determine whether a located pattern hit is relevant.

6. The method of claim 1, wherein the text extraction rule further comprises an exclusion expression to determine whether a located pattern hit is not relevant.

7. The method of claim 1, wherein a rule book includes a plurality of text extraction rules divided into a plurality of text extraction rule groups, wherein a first rule group is chained to a second rule group such that the set of rule hits identified by the first rule group is evaluated by the second rule group.

8. A system for extracting text from a set of documents, the system comprising:
at least one processor; and
at least one memory coupled to the at least one processor and storing instructions that, when executed by the at least one processor, perform operations comprising:
receiving a document for extraction;
identifying a rule book to apply during extraction, wherein the rule book includes one or more text extraction rules, wherein each of the text extraction rules includes at least one match expression, and wherein the at least one match expression includes at least one pattern;
searching a pattern tree on a first set of text in the document to determine whether a pattern hit exists, wherein the pattern tree represents the at least one pattern included in the at least one match expression in each text extraction rule in the identified rule book, and wherein a hit indicates a match between the document text and a pattern in the pattern tree;
repeating the searching step for one or more subsequent sets of text in the document, wherein each set of text is different;
mapping each identified pattern hit to a rule in the one or more text extraction rules in the rule book to generate a set of mapped rules;
for each mapped rule, evaluating one or more predicates included in the mapped rule to determine whether a rule hit exists;
generating a citation for each identified rule hit;
determining whether additional rule books remain to apply during extraction;
if additional rule books remain to apply, identifying a next rule book and repeating the searching, first repeating, mapping, evaluating, generating, and determining steps; and
if no additional rule books remain to apply, storing the generated citations in a citation database.

9. The system of claim 8, wherein the pattern tree including a base node and one or more hierarchical levels, wherein each hierarchical level includes one or more nodes, wherein the base node and each node in the one or more hierarchical levels includes a table, and wherein a path on the pattern tree traversing the base node and a set of nodes on one or more hierarchical levels represents a pattern in the at least one patterns in the rule book.

10. The system of claim 9, wherein the at least one processor is further configured to perform the operation of optimizing the pattern tree by packing the pattern tree into a plurality of arrays, wherein the plurality of arrays includes a table array, a table entries array, and an actions array,
wherein an entry in the table array includes an indication of the number of entries in the array, an index of a table entry in the table entries array, and an index of an action in the actions array,
wherein an entry in the table entry array includes a representation of text that may be matched and an indication of an offset to apply to entries in the actions array; and
wherein an entry in the actions array includes an indication of an action type to execute and a stop flag.

11. The system of claim 9, wherein the at least one processor is further configured to perform the operations of:
generating a first pattern tree, wherein the first pattern tree is an ASCI tree and wherein the first two characters of each pattern in the one or more patterns that fall in the range of a-z, 0-9, and _; and
generating a second pattern tree, wherein the second pattern tree is a non-ASCII tree includes any pattern not included in the first pattern tree.

12. The system of claim 8, wherein the text extraction rule further comprises a context expression to determine whether a located pattern hit is relevant.

13. The system of claim 8, wherein the text extraction rule further comprises an exclusion expression to determine whether a located pattern hit is not relevant.

14. The system of claim 1, wherein a rule book includes a plurality of text extraction rules divided into a plurality of text extraction rule groups, wherein a first rule group is chained to a second rule group such that the set of rule hits identified by the first rule group is evaluated by the second rule group.

15. At least one non-transitory, computer-readable medium carrying non-transitory computer executable instructions which when executed by at least one processor cause a computing system to perform a method for extracting text from a set of documents, the method comprising:
receiving a document for extraction;
identifying a rule book to apply during extraction, wherein the rule book includes one or more text extraction rules, wherein each of the text extraction rules includes at least one match expression, and wherein the at least one match expression includes at least one pattern;

searching a pattern tree on a first set of text in the document to determine whether a pattern hit exists, wherein the pattern tree represents the at least one pattern included in the at least one match expression in each text extraction rule in the identified rule book, and wherein a hit indicates a match between the document text and a pattern in the pattern tree;

repeating the searching step for one or more subsequent sets of text in the document, wherein each set of text is different;

mapping each identified pattern hit to a rule in the one or more text extraction rules in the rule book to generate a set of mapped rules;

for each mapped rule, evaluating one or more predicates included in the mapped rule to determine whether a rule hit exists;

generating a citation for each identified rule hit;

determining whether additional rule books remain to apply during extraction;

if additional rule books remain to apply, identifying a next rule book and repeating the searching, first repeating, mapping, evaluating, generating, and determining steps; and if no additional rule books remain to apply, storing the generated citations in a citation database.

16. The computer-readable medium of claim 15, wherein the pattern tree including a base node and one or more hierarchical levels, wherein each hierarchical level includes one or more nodes, wherein the base node and each node in the one or more hierarchical levels includes a table, and wherein a path on the pattern tree traversing the base node and a set of nodes on one or more hierarchical levels represents a pattern in the at least one patterns in the rule book.

17. The computer-readable medium of claim 16, wherein the operations further comprise optimizing the pattern tree by packing the pattern tree into a plurality of arrays, wherein the plurality of arrays includes a table array, a table entries array, and an actions array, wherein an entry in the table array includes an indication of the number of entries in the array, an index of a table entry in the table entries array, and an index of an action in the actions array, wherein an entry in the table entry array includes a representation of text that may be matched and an indication of an offset to apply to entries in the actions array; and wherein an entry in the actions array includes an indication of an action type to execute and a stop flag.

18. The computer-readable medium of claim 16, wherein the operations further comprise:

generating a first pattern tree, wherein the first pattern tree is an ASCI tree and wherein the first two characters of each pattern in the one or more patterns that fall in the range of a-z, 0-9, and _; and generating a second pattern tree, wherein the second pattern tree is a non-ASCII tree includes any pattern not included in the first pattern tree.

19. The computer-readable medium of claim 15, wherein the text extraction rule further comprises a context expression to determine whether a located pattern hit is relevant.

20. The computer-readable medium of claim 15, wherein the text extraction rule further comprises an exclusion expression to determine whether a located pattern hit is not relevant.

21. The computer-readable medium of claim 15, wherein a rule book includes a plurality of text extraction rules divided into a plurality of text extraction rule groups, wherein a first rule group is chained to a second rule group such that the set of rule hits identified by the first rule group is evaluated by the second rule group.

22. A system for performing data analytics, the system comprising:

at least one processor;

at least one database including a document store, a rule store, an object, trait, and relationship store, and a citation store; and at least one memory coupled to the at least one processor and storing instructions that, when executed by the at least one processor, perform operations comprising:

collecting data from at least one source, transforming the collected data into a set of documents;

publishing the set of documents to the document store;

extracting text for the set of documents, the operation of extracting comprising:

consuming a document from the set of documents, identifying a rule book in the rule store to apply during extraction, wherein the rule book includes one or more text extraction rules, wherein each of the text extraction rules includes at least one match expression, and wherein the at least one match expression includes at least one pattern, searching a pattern tree on a first set of text in the document to determine whether a pattern hit exists, wherein the pattern tree represents the at least one pattern included in the at least one match expression in each text extraction rule in the identified rule book, and wherein a hit indicates a match between the document text and a pattern in the pattern tree, repeating the searching step for one or more subsequent sets of text in the document, wherein each set of text is different, mapping each identified pattern hit to a rule in the one or more text extraction rules in the rule book to generate a set of mapped rules, for each mapped rule, evaluating one or more predicates included in the mapped rule to determine whether a rule hit exists;

generating a citation for each identified rule hit, wherein the citation includes an object, a trait, or relationship;

determining whether additional rule books remain to apply during extraction;

if additional rule books remain to apply, identifying a next rule book and repeating the searching, first repeating, mapping, evaluating, generating, and determining steps; and if no additional rule books remain to apply, storing the generated citations in the citation store and storing the generated object, trait, or relationship in an OTR store; and receiving a query to select a set of objects from the object, trait, and relationship database.

23. The system of claim 22, wherein the at least one memory further stores instructions that, when executed perform the operation of:

configuring workflow for collecting and transforming data from a source in the at least one source.

24. The system of claim 23, wherein the workflow includes a collect stage and a publish stage.

25. The system of claim 24, wherein the workflow includes a divide stage to divide collected items that meet pre-defined criteria into a plurality of portions.

26. The system of claim 24, wherein the workflow includes a split stage to split collected documents into a plurality of smaller documents.

27. The system of claim 22, wherein the at least one memory further stores instructions that, when executed perform the operation of:
 configuring the rule store including the operations of:
  receiving a request to add a new extraction rule to the rule book, wherein the new extraction rule includes at least one match expression,
  parsing the request to add the new extraction rule to validate the new extraction rule,
  re-encoding the at least one match expression to permit patterns in the at least one match expression to be evaluated independently,
  assign each pattern in the at least one match expression a pattern identifier, and
  receiving a request to compile the configuration.

28. The system of claim 22, wherein the pattern tree including a base node and one or more hierarchical levels, wherein each hierarchical level includes one or more nodes, wherein the base node and each node in the one or more hierarchical levels includes a table, and wherein a path on the pattern tree traversing the base node and a set of nodes on one or more hierarchical levels represents a pattern in the at least one patterns in the rule book.

29. The system of claim 28, wherein the at least one processor is further configured to perform the operation of optimizing the pattern tree by packing the pattern tree into a plurality of arrays, wherein the plurality of arrays includes a table array, a table entries array, and an actions array,
 wherein an entry in the table array includes an indication of the number of entries in the array, an index of a table entry in the table entries array, and an index of an action in the actions array,
 wherein an entry in the table entry array includes a representation of text that may be matched and an indication of an offset to apply to entries in the actions array; and
 wherein an entry in the actions array includes an indication of an action type to execute and a stop flag.

30. The system of claim 28, wherein the at least one processor is further configured to perform the operations of:
 generating a first pattern tree, wherein the first pattern tree is an ASCI tree and wherein the first two characters of each pattern in the one or more patterns that fall in the range of a-z, 0-9, and; _; and
 generating a second pattern tree, wherein the second pattern tree is a non-ASCII tree includes any pattern not included in the first pattern tree.

* * * * *